US012385231B2

(12) United States Patent
Horn et al.

(10) Patent No.: US 12,385,231 B2
(45) Date of Patent: Aug. 12, 2025

(54) MEASURING SYSTEM AND CONTROLLER

(71) Applicant: MOBA Mobile Automation AG, Limburg (DE)

(72) Inventors: Alfons Horn, Limburg (DE); Bernd Flessenkämper, Limburg (DE); Dominik Becher, Limburg (DE); Jaroslaw Jurasz, Limburg (DE); Martin Zarniko, Limburg (DE); Michael Fasel, Limburg (DE); Torsten Schönbach, Limburg (DE); Dominik Horn, Limburg (DE); Heiko Groh, Limburg (DE)

(73) Assignee: MOBA Mobile Automation AG, Limburg (DE)

( * ) Notice: Subject to any disclaimer, the term of this patent is extended or adjusted under 35 U.S.C. 154(b) by 621 days.

(21) Appl. No.: 17/815,138

(22) Filed: Jul. 26, 2022

(65) Prior Publication Data

US 2022/0364338 A1 Nov. 17, 2022

Related U.S. Application Data

(63) Continuation of application No. PCT/EP2020/052497, filed on Jan. 31, 2020.

(51) Int. Cl.
*E02F 9/26* (2006.01)
*E01C 19/43* (2006.01)
*E01C 23/01* (2006.01)
*G01B 17/00* (2006.01)
*G01B 21/04* (2006.01)
(Continued)

(52) U.S. Cl.
CPC .............. *E02F 9/265* (2013.01); *E01C 19/43* (2013.01); *E01C 23/01* (2013.01); *G01B 17/00* (2013.01); *G01B 21/045* (2013.01); *G01B 21/047* (2013.01); *G01B 21/08* (2013.01); *G01B 21/22* (2013.01)

(58) Field of Classification Search
CPC .......... E02F 9/265; E01C 19/43; E01C 23/01; G01B 17/00; G01B 21/045; G01B 21/047; G01B 21/08; G01B 21/22
USPC ...................................... 404/84.05–84.5, 118
See application file for complete search history.

(56) References Cited

U.S. PATENT DOCUMENTS 3,334,560 A    8/1967   Long et al.
3,908,765 A    9/1975   Hawkins
(Continued)

FOREIGN PATENT DOCUMENTS

CA    2832956 C    11/2016
CN    1743552 A    3/2006
(Continued)

OTHER PUBLICATIONS

Fischer Connectors®, "Fischer Freedom™ Series", Fischer Connectors, K Chapter.
(Continued)

*Primary Examiner* — Raymond W Addie
(74) *Attorney, Agent, or Firm* — PERKINS COIE LLP; Michael A. Glenn

(57) ABSTRACT

The invention relates to a measuring system for a construction machine having a carrier including several portions, a measuring system for a construction machine including a calculation unit determining a regression line as well as a controller having two control loops.

27 Claims, 35 Drawing Sheets

(51) Int. Cl.
*G01B 21/08* (2006.01)
*G01B 21/22* (2006.01)

(56) References Cited

U.S. PATENT DOCUMENTS

| | | | |
|---|---|---|---|
| 4,647,784 | A | 3/1987 | Stephens |
| 5,327,345 | A | 7/1994 | Nielsen et al. |
| 5,356,238 | A | 10/1994 | Musil et al. |
| 5,393,167 | A | 2/1995 | Fujita et al. |
| 5,401,115 | A | 3/1995 | Musil et al. |
| 5,430,651 | A | 7/1995 | Nielsen et al. |
| 5,484,227 | A | 1/1996 | Ikeda et al. |
| 5,546,123 | A | 8/1996 | Ikeda et al. |
| 5,721,685 | A | 2/1998 | Holland et al. |
| 5,975,473 | A * | 11/1999 | Haas ............... G01S 7/521 |
| | | | 172/4 |
| 5,984,420 | A | 11/1999 | Murray et al. |
| 6,287,048 | B1 | 9/2001 | Hollon et al. |
| 6,729,596 | B2 * | 5/2004 | Fumado Gilabert . E01C 19/004 |
| | | | 248/550 |
| 7,172,363 | B2 | 2/2007 | Olson et al. |
| 7,344,380 | B2 | 3/2008 | Neidlein et al. |
| 8,132,935 | B2 * | 3/2012 | Park ................... F21V 13/02 |
| | | | 362/249.02 |
| 8,371,769 | B2 | 2/2013 | Worsley et al. |
| 8,794,868 | B2 | 8/2014 | Fritz |
| 8,944,719 | B2 | 2/2015 | Frelich et al. |
| 9,033,611 | B2 | 5/2015 | Hanfland et al. |
| 9,529,087 | B2 | 12/2016 | Stainvas et al. |
| 9,587,737 | B2 | 3/2017 | Bartl |
| 9,587,937 | B2 | 3/2017 | Buschmann et al. |
| 9,609,780 | B2 | 3/2017 | Eble et al. |
| 10,363,883 | B2 * | 7/2019 | Herzberg ............... E01C 19/48 |
| 2004/0068896 | A1 | 4/2004 | Sehr |
| 2006/0045620 | A1 | 3/2006 | Olson et al. |
| 2006/0051981 | A1 | 3/2006 | Neidlein et al. |
| 2008/0050965 | A1 | 2/2008 | Szelag et al. |
| 2009/0226255 | A1 | 9/2009 | Lossow |
| 2012/0170228 | A1 * | 7/2012 | Lai ................... H01R 12/716 |
| | | | 361/740 |
| 2012/0321384 | A1 | 12/2012 | Hanfland et al. |
| 2014/0342577 | A1 | 11/2014 | De Bruijn |
| 2015/0115181 | A1 | 4/2015 | Eble et al. |
| 2017/0044726 | A1 | 2/2017 | Buschmann et al. |
| 2017/0160094 | A1 | 6/2017 | Zhang et al. |
| 2017/0292230 | A1 | 10/2017 | Herzberg |
| 2018/0164829 | A1 | 6/2018 | Oshima et al. |
| 2018/0237999 | A1 | 8/2018 | Højland et al. |
| 2019/0119865 | A1 | 4/2019 | Weber et al. |
| 2019/0136467 | A1 | 5/2019 | Laugwitz |
| 2021/0181354 | A1 | 6/2021 | Becher et al. |
| 2021/0318440 | A1 | 10/2021 | Impola et al. |
| 2023/0004744 | A1 | 1/2023 | Pfeiffer et al. |

FOREIGN PATENT DOCUMENTS

| | | |
|---|---|---|
| CN | 101145653 A | 3/2008 |
| CN | 201660836 U | 12/2010 |
| CN | 201770931 U | 3/2011 |
| CN | 102828457 A | 12/2012 |
| CN | 103492967 A | 1/2014 |
| CN | 103797659 A | 5/2014 |
| CN | 106522065 A | 3/2017 |
| CN | 108235712 A | 6/2018 |
| CN | 109356005 A | 2/2019 |
| CN | 112945293 A | 6/2021 |
| CN | 113152215 A | 7/2021 |
| DE | 4204481 A1 | 10/1992 |
| DE | 29723171 U1 | 4/1998 |
| DE | 69411794 T2 | 3/1999 |
| DE | 19755324 A1 | 6/1999 |
| DE | 19951296 A1 | 6/2001 |
| DE | 10060903 A1 | 7/2002 |
| DE | 10138563 A1 | 2/2003 |
| DE | 10234217 A1 | 2/2004 |
| DE | 102005040326 A1 | 4/2006 |
| DE | 102011113752 A1 | 3/2013 |
| DE | 102011119272 A1 | 5/2013 |
| DE | 102015008315 A1 | 1/2017 |
| DE | 102017010238 A1 | 5/2019 |
| EP | 0542297 A1 | 5/1993 |
| EP | 1118713 A1 | 7/2001 |
| EP | 1179636 A1 | 2/2002 |
| EP | 1537632 A1 | 6/2005 |
| EP | 2597321 A1 | 5/2013 |
| EP | 3133213 A1 | 2/2017 |
| EP | 3712328 A1 | 9/2020 |
| EP | 3955162 A1 | 2/2022 |
| JP | H02136405 A | 5/1990 |
| JP | H04179705 A | 6/1992 |
| JP | H0749642 B2 | 5/1995 |
| JP | 2013231354 A | 11/2013 |
| WO | 2012140191 A1 | 10/2012 |
| WO | 2020088782 A1 | 5/2020 |
| WO | 2021151511 A1 | 8/2021 |
| WO | 2022037764 A1 | 2/2022 |

OTHER PUBLICATIONS

Fischer Connectors®, "Fischer Freedom™ Series, Easy Mating, Easy Cleaning, Easy Integration", Version 1.2—Aug. 2019, Aug. 2019, 2 pp.

Gourdon, Jean-Louis, et al., "[Uploaded in 3 parts] Modelling and Controlling the Road Finishing Process", B.P. 19—44340 Bouguenais—France, pp. 479-483.

ROPD®, "RoPD®", Rosenberger Hochfrequenztechnik Gmbh & Co. KG website: https://www.rosenberger.com/de/produkt/ropd/, Jul. 4, 2022, 9 pp.

ROPD®, "RoPDR Cable Assemblies", Technical Data RoPD®.

Rosenberger Hochfrequenztechnik , "RoPD® Connectors, Magnetic Connecting System—Power and Data Transmission for LEV", RoPD® Connectors, Magnetic Connecting System—Power and Data Transmission for LEV, Status Oct. 2016, Oct. 2016, 9 pp.

TF Paving Academy, "Mini-Line® Super Averaging Beam Brochure", tf Paving Academy, Mini-Line® Super Averaging Beam, v. L1001905.

TF Paving Company, "Mini-Line® Easy Averaging Beam", tf Paving Company, Mini-Line® Easy Averaging Beam, 11002303.

TF Technologies Paving Inn, "Installation Manual", tf Technologies Paving Innovation, Mini-Line® Super Averaging Beam, Installation Manual, published Apr. 5, 2018, Apr. 5, 2018, 37 pp.

TF Technologies Paving Inn, "Mini-Line® Easy Averaging Beam Data Sheet", tf Technologies Paving Innovation, Mini-Line® Easy Averaging Beam, v. H804606, pp. 1-2.

TF Technologies Paving Inn., "Mini-Line® Easy Averaging Beam, Installation Manual", tf Technologies Paving Innovation, Mini-Line® Easy Averaging Beam, Installation Manual, published Sep. 5, 2018, Sep. 5, 2018, 33 pp.

TF Technologies Paving Inn., "Super Averaging Beam Data Sheet", tf Technologies Paving Innovation, Mini-Line® Super Averaging Beam, v. H812403 pp. 1-3.

Topcon Laser Systems, Inc., "SMOOTHTRACTM, Sonic Averaging Systems (SAS), Operation & Maintenance Manual", Topcon Laser Systems, Inc., SMOOTHTRACTM, Sonic Averaging Systems (SAS), Operation & Maintenance Manual, Cedarapids, A Terex Company, 22506 (Nov. 2000), Nov. 2000, 20 pp.

\* cited by examiner

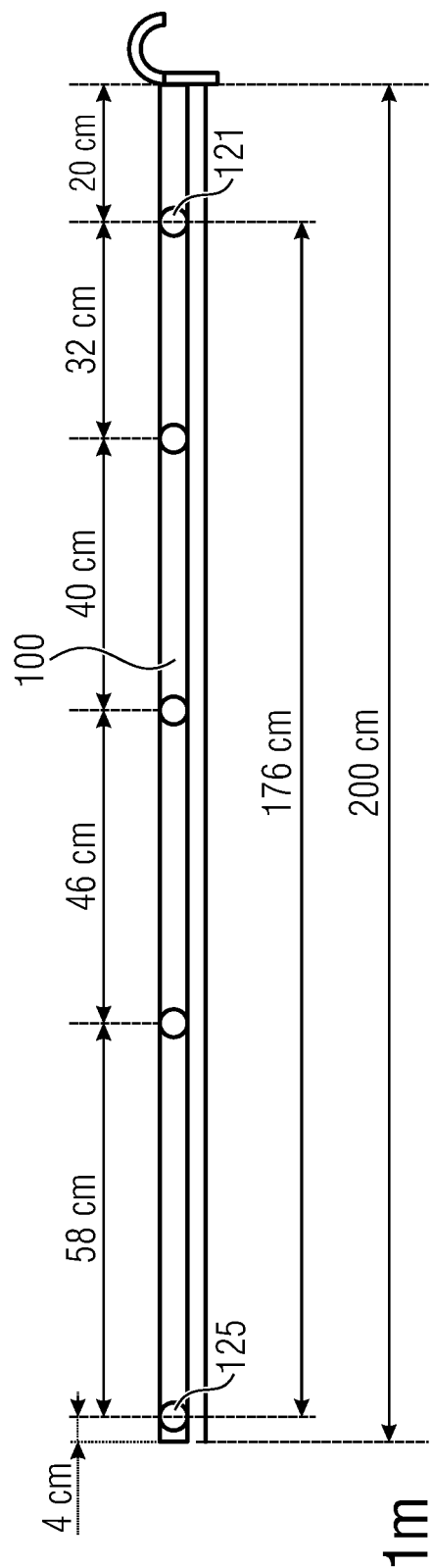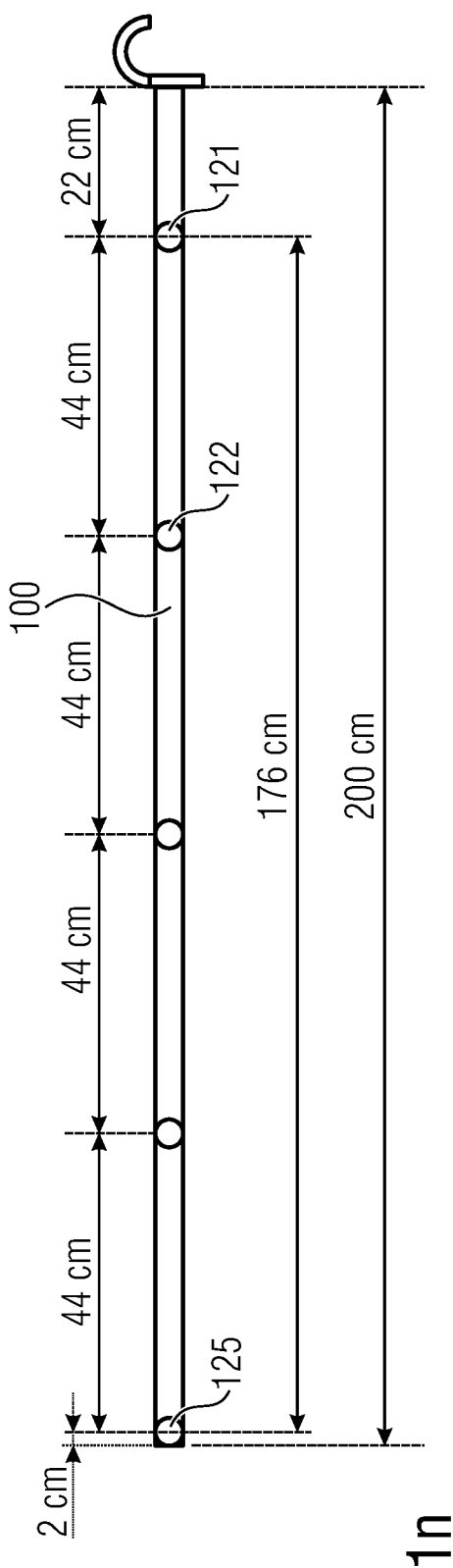

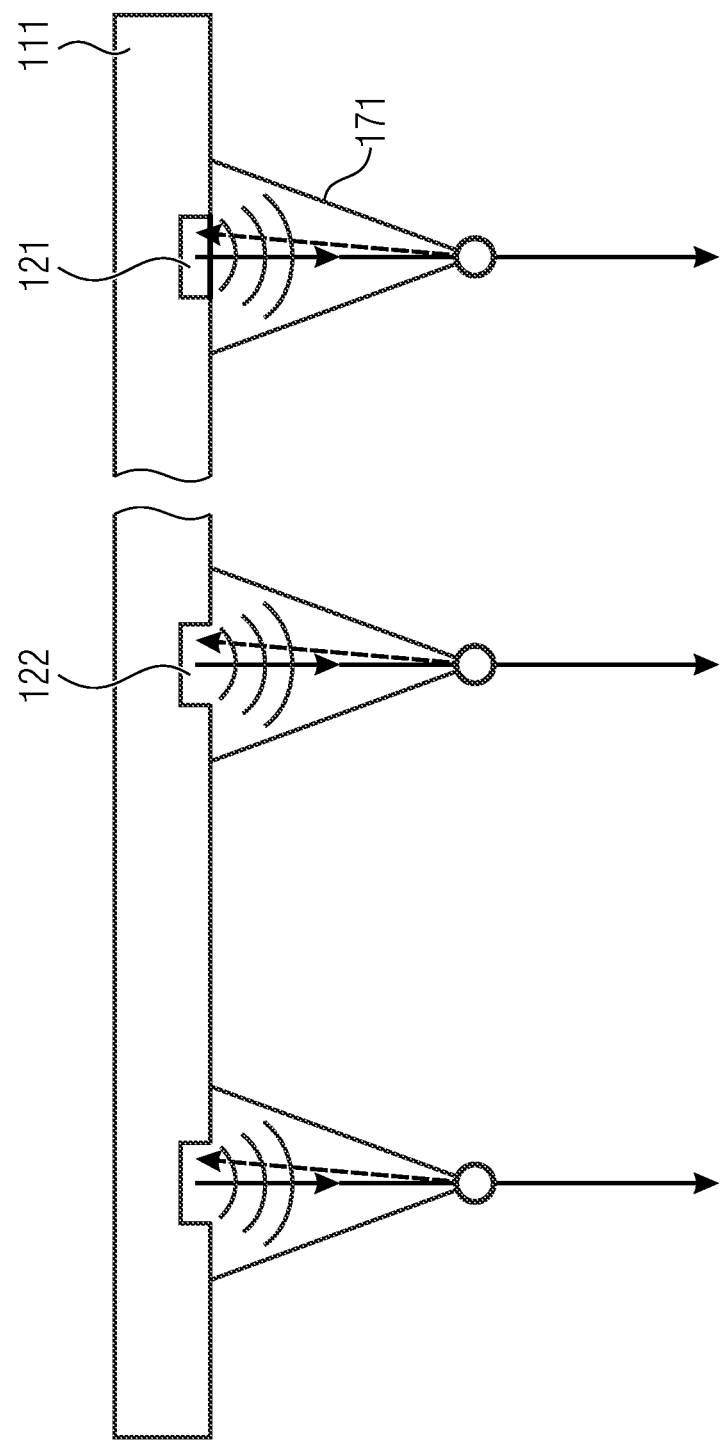

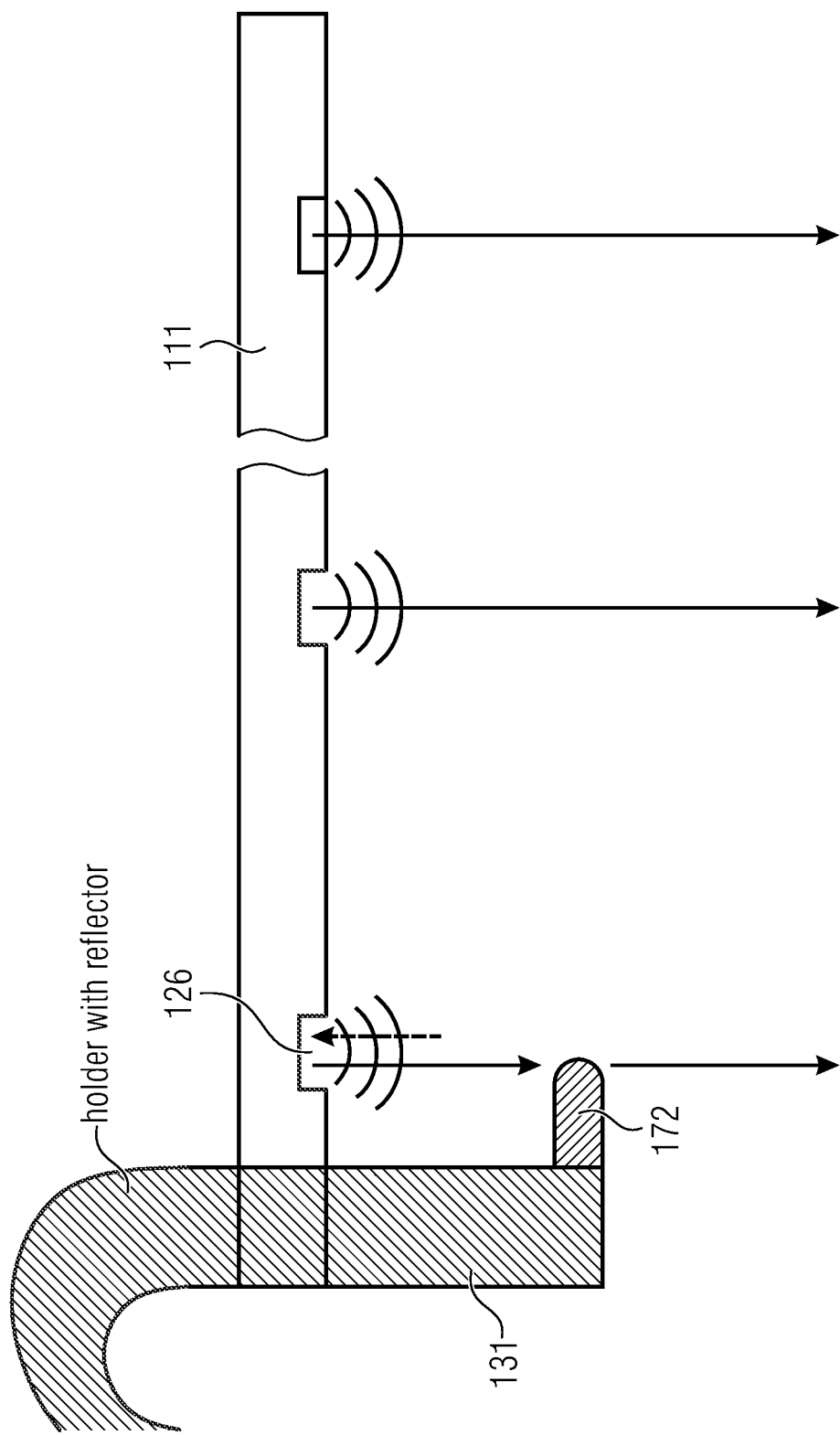

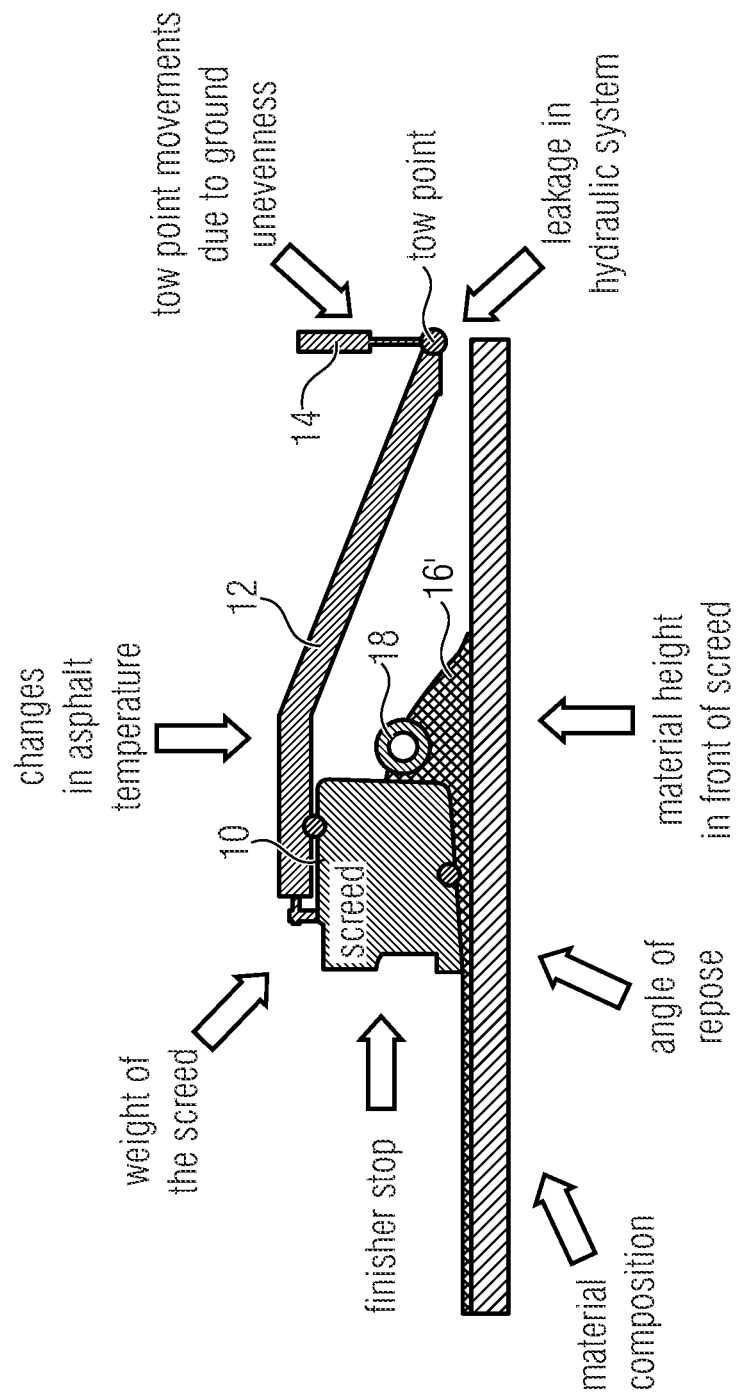

MEASURING SYSTEM AND CONTROLLER

CROSS-REFERENCE TO RELATED APPLICATIONS

This application is a continuation of copending International Application No. PCT/EP2020/052497, filed Jan. 31, 2020.

Embodiments (aspect 1) relate to a measuring system and to a construction machine comprising a measuring system. Embodiments of this first aspect relate to a measuring system and a construction machine comprising a measuring system. Embodiments of this first aspect relate to a measuring system including a carrier with attached or integrated sensor heads.

Another embodiment (aspect 2) relates to a measuring system, a corresponding method, and a construction machine. Embodiments of this second aspect relate to a measuring system comprising a calculation unit that determines a regression line.

Another embodiment (aspect 3) relates to a controller for a construction machine, a screed control system and a corresponding method. Embodiments of this third aspect are a controller having two control loops, and in particular for controlling the screed of a road finishing machine.

BACKGROUND OF THE INVENTION

FIG. 4 shows a known road finishing machine as described, for example, in EP 0 542 297 A1. The road finishing machine in its entirety is designated by the reference numeral 1 and comprises a crawler track 2 with which the road finishing machine 1 travels on the prepared ground 4. A height-adjustable screed 10 is arranged at the rear end of the road finishing machine 1 in the direction of travel, which is steered at the road finishing machine 1 by means of a tow arm 12 at a tow point 14 ZP. The height of the tow point 14 ZP can be adjusted by means of the cylinder 14 (not shown). A supply 3 of the asphalt material is located in front of the screed 10, and this supply is kept substantially constant over the entire width range of the screed 10 by appropriate control, known per se, of the rotational speed of a spiral-type conveying device 4. The screed 10 floats on the asphalt of the road surface 16 to be produced. The thickness of the road surface to be finished before its final consolidation by road rollers is adjusted by controlling the height position of the rear edge 10k of the screed 10. This height control is induced by changing the tilt angle of the screed 10, and is typically accomplished by controlling actuating cylinders that engage the front ends of the tow arms 12. The road finishing machine includes three ultrasonic sensors 5a, 5b, 5c attached to a holder 5h. The holder 5h is attached to the tow arm 12. The three ultrasonic sensors 5a, 5b, 5c are used to scan a reference surface, which may be formed, for example, by an already paved or old track of the road surface.

Aspect 1

In construction machines, such as road construction machines in particular, the distance to the ground or to a reference, such as a tensioned rope or a curb or an already paved adjacent layer, is measured at one or more points, as explained in connection with FIG. 4. For this purpose, ultrasonic sensors have become established on the market in recent years, which are mounted by means of cantilevers, e.g. to a screed of the road finishing machine, a tow arm of a road finishing machine and/or a chassis of the road finishing machine. In some applications, a so-called Sonic-Ski is used, which combines several parallel measuring heads to form one distance sensor.

In another conventional solution (Big Sonic-Ski or in short Big Ski), a plurality of distance sensors, such as ultrasonic measuring heads or also sensors based on another measuring principle, such as lasers, are attached to the tow arm via a common linkage. The linkage extends in the direction of travel approximately along or even beyond the length of the machine and is arranged such that a distance to the ground can be measured at two, three or more measuring points along this linkage or direction of travel. For example, one sensor may be aligned with the applied layer, while another sensor is aligned with the ground for the layer to be applied. Thus, two or more sensor heads are provided here, with one sensor head located in front of the screed and one sensor head located behind the screed.

This so-called Big Sonic-Ski (or Big Ski) application has a number of advantages, such as the fact that systematic faulty measurements, e.g. caused by stones on the ground, can be faded out or averaged out. A disadvantage of this so-called Big Sonic-Ski is that the installation effort for the linkage and the individual sensor heads is quite high. Based on the fact that, in order to prevent possible theft, such measuring systems are taken off overnight, this installation effort is not negligible in the daily work routine. Therefore, there is need for an improved approach.

SUMMARY

An embodiment may have a construction machine including a measuring system, wherein the measuring system includes a carrier connectable to the construction machine, such that the carrier extends along a longitudinal axis of the construction machine, especially laterally to the same, including: at least a first portion of the carrier; wherein the first portion includes a plurality of sensor heads attached to or integrated with the first portion for non-contact measurement against a ground or reference as well as first and second end faces, and wherein the first portion includes a second connecting element at a second end face, the second connecting element being connectable to a first connecting element such that both a mechanical and electrical connection is formed.

Another embodiment may have a construction machine, in particular a road construction machine such as a road finishing machine of road milling machine including a screed and a screed control system including a control and at least one actuator for tow point adjustment, wherein the control is connected to a first sensor in the area of the screed and to a second sensor in the area of the tow point, and wherein the controller is configured to adjust a tow point of the screed, wherein the controller includes a first and a second control loop, wherein the first control loop varies the tow point in dependence on a first sensor value and wherein the second control loop varies the tow point in dependence on a second sensor value, wherein the first sensor value, measured with the first sensor, represents a distance to a ground or a reference in the area of the screed, and wherein the second sensor value, measured with the second sensor, represents a distance to a ground or reference in the area of the tow point, wherein the reference in the area of the screed and the reference in the area of the tow point includes an already deposited layer or a ground for the layer to be deposited or a rope along the ground or an edge along the ground or a curb or a line running along the ground or a reference relative to a central transmitter or relative to a total station or relative to a projected laser plane, or wherein the reference in the area of the tow point includes an already deposited layer or a ground for the layer to be deposited or a rope along the ground or an edge along the ground or a curb or a line running along the ground or a reference relative to a central transmitter or relative to a total station or relative to a projected laser plane.

According to another embodiment, a method for controlling a road construction machine including a screed may have the steps of: adjusting a tow point of the screed by using a first and second control loop, varying the tow point in the first control loop in dependence on a first sensor value; and varying the tow point in the second control loop in dependence on a second sensor value, wherein the first sensor value represents a distance to a ground or a reference in the area of the screed, and wherein the second sensor value represents a distance to a ground or a reference in the area of the tow point, wherein the reference in the area of the screed and the reference in the area of the tow point includes an already deposited layer or a ground for the layer to be deposited or a rope along the ground or an edge along the ground or a curb or a line running along the ground or a reference relative to a central transmitter or relative to a total station or relative to a projected laser plane, or wherein the reference in the area of the tow point includes an already deposited layer or a ground for the layer to be deposited or a rope along the ground or an edge along the ground or a curb or a line running along the ground or a reference relative to a central transmitter or relative to a total station or relative to a projected laser plane.

Another embodiment may have a non-transitory digital storage medium having a computer program stored thereon to perform the inventive method when the program runs on an inventive construction machine including a measuring system, wherein the measuring system includes a carrier connectable to the construction machine.

An embodiment provides a measuring system or arrangement for a construction machine, such as a road finishing machine or milling machine. The measuring system comprises a carrier connectable to the construction machine (or a component, such as the screed (or plank) or the tow arm of the construction machine), for example, such that the carrier extends along a ground. For example, the carrier may extend along a longitudinal axis of the construction machine, laterally thereto. The carrier comprises at least a first portion, the first portion having a plurality of sensor heads attached to or integrated with the first portion for non-contact measurement against a ground or, in general, reference. These are aligned, for example, in parallel, i.e. have a scanning area extending in parallel or substantially parallel. The first portion has a second connecting element at a second end face, the second connecting element being connectable to a first connecting element such that both a mechanical and electrical connection is formed.

According to the embodiments, an electrical connection is understood to be a direct contact, an inductive connection or a contactless connection.

According to further embodiments, the measuring system comprises a second portion of the carrier, wherein the second portion also comprises a plurality of attached/integrated (parallel) sensor heads. The second portion has the first connecting element at a first end face such that the second connecting element of the first portion is connectable to the first connecting element of the second portion. According to embodiments, a second portion may have a second connecting element at a second end face and/or the first portion can have a first connecting element at a first end face. In this respect, these two portions can be formed identically so that not only two portions can be plugged together to form a carrier, but also a plurality of portions.

Embodiments of the present invention are based on the finding that the use of fastened/integrated sensor heads in a carrier which is subdivided into one or more portions can significantly reduce the assembly effort. Due to the fact that the connecting elements form a mechanical and an electrical connection at the same time, no wiring is needed. According to embodiments, the connection between the portion and the construction machine can also be made via a corresponding connecting element. For example, the first portion can be connectable to the construction machine (which has a corresponding second portion as a counterpart) by means of its first connecting element. Here, too, an electrical connection can be formed in addition to the mechanical connection, for example. According to embodiments, the measuring system can be extended by the further portions with attached/integrated sensor heads in order to be able to scan a large area simultaneously. Thus, when a measuring system with two portions per carrier is set up in this way, only two connections (one to the machine and one between the two portions) need to be made, rather than attaching and wiring the individual sensor heads. This saves a significant amount of time over the conventional approach. The fact that the sensor heads are also all aligned with one another also means that no further adjustment is needed, which ensures overall measurement quality.

There are different approaches for the mechanical connection. Three embodiment variations are explained below, although others would also be possible.

According to a first embodiment variation, a type of hook connection can be used. According to embodiments, the first and/or the second connecting element may have a hook such that the first connecting element and the second connecting element may be engaged by a rotational movement. According to further embodiments, the hook of the first connecting element or the hook of the second connecting element or the hooks of the first connecting element and the second connecting element may have an engagement surface, which is opened substantially perpendicular to the longitudinal direction of the respective portion.

Here, the rotational movement is defined by an end stop, which needs the first and second end face, or end surfaces to be in contact. According to further embodiments, the first and/or the second connecting element may comprise an electrical coupler extending substantially along the longitudinal direction of the respective portion.

According to the further embodiments, a shear movement of the two portions or of a portion relative to another connecting element can also form the connection. In this embodiment, the first and/or the second connecting element may comprise a profile extending substantially perpendicular to the longitudinal direction of the respective portion and having an end stop such that the two connecting elements are connectable by a translational movement substantially perpendicular to the longitudinal direction of the respective portion. According to embodiments, the first connecting element comprises a lever mechanism, for example comprising an eccentric, for translationally fixing the first connecting element to the second connecting element. According to an embodiment, the first and/or the second connecting element may each comprise an electrical coupler extending substantially perpendicular to the longitudinal direction of the respective portion.

According to another embodiment variation, a translational movement of the two portions relative to each other for forming the connection would also be conceivable. Therefore, according to comparative examples, the first connecting element may comprise a sleeve extending substantially in the longitudinal direction of the respective portion, and wherein the two connecting elements are connectable by inserting the second connecting element into the sleeve. According to embodiments, the first and/or the second connecting element may comprise a respective electrical coupler extending substantially along the longitudinal direction of the respective portion.

According to further embodiments, the measuring system has a fastening element. This can be connected to the construction machine or a component of the construction machine and has a first and/or a second connecting element. This can be done, for example, in such a way that the first portion can be connected to the construction machine or the component of the construction machine.

According to embodiments, the first and/or the second portion may have sensor heads aligned on a longitudinal side perpendicularly to the longitudinal axis of the first and the second portion. In other words, the sensor heads are aligned with the ground (in the installed state), i.e. the sensor heads are aligned with the already applied layer or with the ground for the layer to be applied.

As already explained above, the sensor heads are attached or integrated, with a plurality, i.e. at least three sensor heads, being attached/integrated per portion. The higher the number or density of the sensors, the better unevenness of a certain wavelength, e.g. 5 m, is compensated.

According to embodiments, the measuring principles of the sensor heads may differ, i.e., the sensor heads may be designed, for example, as ultrasonic sensors, as laser sensors or as radar sensors or the like. According to a variant, the sensor heads are spaced apart from each other, e.g. 10 cm, 20 cm, 33 cm, 40 cm or generally in the range of 5 cm to 50 cm or 2 cm to 100 cm. The distance can be adjusted accordingly depending on the measuring principle of the sensor heads. For example, the distance can be selected so that there is an equal distribution over the respective section or over the carrier. Furthermore, the distance from sensor/sensor head to sensor/sensor head can change, such as increase. This is advantageous when compensating for unevenness in the layer to be applied with certain frequencies/wavelengths.

According to further embodiments, the measuring system may comprise, for each first and/or second portion or carrier, at least one first further sensor head which is aligned parallel to the longitudinal axis and/or which is arranged at the first and/or second end face; and/or wherein the first further sensor head is configured to perform a reference measurement. Here, according to embodiments, the measuring system may comprise, for each first and/or second portion, a second sensor head arranged along the longitudinal axis of the respective first and/or second portion or of the carrier and located at the opposite end face to the first further sensor head. For determining the reference, according to further embodiments, the measuring system may comprise a reflector (e.g. parallel to the longitudinal axis) or an inclined reflector (e.g. 135° inclined to the longitudinal axis) at the first and/or second end face. The reflector may also be integrated/formed in the receptacle of one and/or more sensor heads.

According to further embodiments, it would also be conceivable for the measuring system to comprise, per first and/or second portion or per carrier, at least one additional sensor head, which is aligned parallel to the longitudinal axis and/or which is arranged at the first and/or second end face; the additional sensor head is configured to determine a distance to an object performing a relative movement with respect to the construction machine or a component of the construction machine.

According to embodiments, measurements of the sensor heads are performed substantially simultaneously, i.e. within a time window of 3 s, 1 s, 0.5 s, 0.1 s or smaller, for example. Distance measurements to the ground (reference to the already applied layer or to the ground for the layer to be applied) and/or to the object, and/or as reference measurement(s) are performed substantially simultaneously (synchronous measurement within a time window, as indicated above). That is, it is possible for all the sensor heads arranged in the measuring system to perform measurements substantially simultaneously. This is advantageous with regard to the measurement accuracy of the measuring system, since a simultaneous measurement in principle provides a snapshot of, for example, the ground or reference profile and the reference measurement(s) under the same conditions (for example, environmental conditions). In contrast to an asynchronous measurement (not performed at the same time, for example one after the other), changes in distances or external conditions, for example triggered by mechanical vibrations (oscillations) of the machine or the tool or of machine parts or triggered by temperature fluctuations, are not relevant in a measurement performed essentially at the same time, since at the moment of the (simultaneous) measurements, for example, the ground or reference profile is detected by the measuring system at the correct distance and reference measurement(s) are also performed under the same conditions. Thus, a correct reference profile or correct profile of the ground is detected by all the sensor heads in all the portions and all the carriers of the measuring system. Furthermore, simultaneous measurement is advantageous with regard to a high measuring rate (scan rate), as is needed nowadays for leveling in road construction (for example, height leveling of the screed).

According to a further embodiment, the first and/or the second portion comprise a display, such as an LED, LED display. The display or LED display is configured to display a connection status between the first and second or each further portion or to display information, e.g. regarding a deviation, of the measuring system or of a regulating and/or control system connected to the measuring system. An LCD display or the like is also conceivable here as a display on which, for example, text and/or symbols are displayed.

According to further embodiments, the measuring system may include a GNSS sensor, an inclination sensor, an infrared sensor, a temperature sensor, a position sensor (Inertial Measurement Unit), or another sensor. According to examples, each portion may also include illumination.

According to a further embodiment, the measuring system has a first connecting element on a (first) end face, the first connecting element being connected to a second connecting element which is attached to the machine, example, and on the second end face where a further measuring system, e.g. a distance measuring system, is attached.

According to further embodiments, a calculation unit is configured to use the first measuring value and the second measuring value to determine a regression line together with a slope of the regression line relative to the ground or the reference and, based on the slope, to determine an angle which describes the slope of the regression line and the position of the component of the construction machine relative to the ground or the reference.

Another embodiment relates to a construction machine, such as a road construction machine comprising a measuring system explained above.

Aspect 2

Components of construction machines, such as a screed, are monitored with regard to their position. For example, there are angle or inclination sensors, which determine the rotation of the screed about its longitudinal axis, i.e. the tilting of the screed relative to the ground. Since the screed or components of construction machines in general are subject to considerable disturbance influence, such as vibrations, mechanisms are needed to compensate for this disturbance influence.

In the state of the art, for example, the inclination is determined using different measuring principles in order to combine the advantages of different measuring principles in terms of "immunity to disturbance", accuracy, etc.

Embodiments of the present invention provide a measuring system for a construction machine, wherein the measuring system has a carrier connectable to a component of the construction machine. In the basic implementation, the measuring system includes at least a first, second, and third sensor heads and a calculation unit. The first, second and third sensor heads are connected to the carrier. The alignment may again be parallel; the system may also be used according to embodiments according to aspect 1. In general, the sensor heads are configured to measure a first distance from the first sensor head to the ground or a reference to obtain a first measuring value, or to measure a second distance from the second sensor head to a ground or a reference to obtain a second measuring value, or to measure a third distance from the third sensor head to a ground or a reference to obtain a third measuring value. The calculation unit is configured to determine, based on the first, second and third measuring values, a regression line together with a slope of the regression line relative to the ground or the reference and, based on the slope, to determine an angle which describes the slope of the regression line and thus the position of the component of the construction machine relative to the ground or the reference.

According to embodiments, the component may comprise a tow arm or a screed or a screed connected fixedly via the tow arm, rigidly and/or at least rigidly during the working process, i.e. in particular with a fixedly defined relationship or a relationship at least defined fixedly during the working process.

Embodiments of the present invention are based on the finding that a regression line and, in particular, the position of the regression line in space can be determined by three measuring values. Assuming that the sensors (which are spaced apart from each other, for example) are arranged on a carrier which is arranged or fixed in a known or fixed position with respect to the component, a regression line which lies at a fixed angle with respect to the component can be determined by the three measuring values. For example, the regression line can be arranged parallel to the position of the component.

Starting from an initial state in which the position of the component is known, a conclusion can be drawn on a change in position of the component by observing the change in position of the regression line. Knowing the position of the regression line or the position of the sensor heads relative to the component (e.g. distance along the carrier and offset), it is also possible to determine the position (relative to the reference or the ground) of the regression line and thus also of the component. Since the regression line usually does not depend too much on individual measurements, a very accurate and at the same time robust measurement is made possible.

The use of more than two sensor values or, in particular, the use of more than two measuring points in a sequence of temporally successive measurements makes the results of the regression line (calculation) particularly stable and robust. Furthermore, the values change uniformly over the carrier due to the rigid coupling so that the position is advantageously detectable even despite disturbances (objects on the ground or vibrations). By determining the position of the regression line, the position, such as an inclination of a component, can be detected in a robust manner.

According to the embodiment, the carrier can be arranged behind the screed, e.g. firmly connected to the screed. The carrier is then directed towards the layer just applied and, using the layer as a reference, enables the position of the screed to be determined. For example, it would be conceivable for the carrier to extend along the longitudinal axis in order to determine the rotation of the screed about its longitudinal axis (note: the longitudinal axis of the screed extends transversely to the direction of travel of a road finishing machine as described at the beginning). If the carrier is arranged transverse to the longitudinal direction or at an angle (e.g. 45°), a profile and/or additionally a lateral inclination (in addition to the profile) can be determined.

According to another embodiment, the measuring system around a further carrier with further (three) sensors can also be considered. It can be arranged behind the screed, for example. With this approach, two regression lines are then determined, with a lateral offset of the first regression line relative to the second regression line corresponding to a layer thickness. This layer thickness measuring system is robust to rotations of the screed because, assuming, for example, that the two carriers are in line or parallel to each other, the regression lines are also parallel. The parallel offset corresponds to the layer thickness, regardless of how the regression lines are in the solid angle.

In this respect, another embodiment provides a layer thickness measuring system. The layer thickness measuring system for a construction machine includes a carrier and further carriers connectable to a screed of the construction machine such that the carrier extends in front of the screed and the further carrier extends behind the screed. It further includes a first, second, and third sensor heads connected to the carrier and configured to measure a first distance from the first sensor head to a ground or reference to obtain a first measuring value, and to measure a second distance from the second sensor head to a ground or reference to obtain a second measuring value; and to measure a third distance from the third sensor head to a ground or reference to obtain a third measuring value. Additionally, further first, second and third sensor heads are provided, which are connected to a further carrier and are configured to measure a further first, second and third distance from the further first, second and third sensor head to the ground/reference to obtain a further first, second and third measuring value; a calculation unit is configured to determine a regression line based on the first, second and third measuring values and to determine a further regression line based on the further first, further second and further third measuring values. The calculation unit is configured to determine a layer thickness based on the position of the regression line relative to the further regression line.

According to embodiments, the layer thickness measuring system can be configured such that the mutual position of the carrier and the further carrier is known and thus the regression line and the further regression line can also be aligned so that they run parallel. As already mentioned, the offset of the regression lines to each other represents or corresponds to the layer thickness or, generally speaking, allows a conclusion to be drawn.

According to a further variation, the measuring system can also be attached to another component, such as the chassis itself, in order to determine a position here.

According to another embodiment, the measuring system may comprise four sensor heads arranged, for example, on a common carrier. According to embodiments, the calculation unit may be configured to define a regression line starting from a point cloud in order to determine the first, the second, the third and the fourth measuring values. The regression line is arranged in space such that the distances are, for example, minimal to the points of the point cloud.

Since a relative inclination to a reference or to the ground is determined by means of the regression line, the measuring system can be extended to include an inclination sensor, in which case the calculation unit is configured, for example, to determine an absolute inclination of the component of the construction machine on the basis of the absolute inclination, determined by the inclination sensor, together with the angle, determined via the regression line.

Starting from a driving condition (e.g. speed<2 km/h), several measuring values are determined in succession for each sensor head. To determine the regression line, time averaging is performed for each measuring point or time averaging of the regression parameters after repeated determination of these parameters. According to further embodiments, the averaging can also be carried out locally or in a different way.

The first and second sensor heads or, in embodiments of multiple sensor heads, the sensor heads are typically spaced apart. According to an embodiment, the calculation unit can be configured to take the distance of the sensor heads into account. This is especially important to determine the slope of the regression line. Furthermore, the calculation unit can be configured to use a velocity signal, which can be generated from a path signal or position signal, e.g. GNSS signal, to generate a path-related/position-related measurement from a time-related measurement. Thus, stationary disturbances can be reacted to.

Another embodiment provides a construction machine, such as in particular a road construction machine with a measuring system or a layer thickness measuring system.

Another embodiment provides a method for determining a position of a component of a construction machine using a measuring system having a carrier connectable to a component of the construction machine. The method comprises the following steps: determining, based on the first measuring value, the second measuring value, and the third measuring value, a regression line along with a slope of the regression line with respect to the ground; and determining, based on the slope, an angle describing the slope of the regression line and the position of the component of the construction machine with respect to the ground.

The method may, assuming further sensor heads on a further carrier, also comprise the following steps: determining a further regression line together with a slope of the further regression line relative to the ground based on the further first, second and third measuring values; determining an angle describing the slope of the further regression line and the position of the component of the construction machine relative to the ground based on the slope; and determining a layer thickness based on the regression line and the further regression line.

Another method refers to determining a layer thickness. This method comprises three steps: determining a regression line based on the first, second and third measuring values; and determining a further regression line based on a further first, second and third measuring values; determining a layer thickness based on the position of the regression line relative to the further regression line.

The method may also be computer-implemented according to embodiments. Therefore, another embodiment relates to a computer program for performing the method according to any of the previous aspects.

Aspect 3

If the main task of a road finishing machine is considered, the same consist of ensuring continuous evenness during the paving process. However, due to a large number of different disturbances, there are such impacts that the desired evenness is at least impaired.

A decisive disadvantage of screed height levelling is that the measurement of the screed's height information does not take place near the rear edge of the screed, but in the region of the screed auger. This is ultimately a compromise solution so that, despite the very inert behavior of the screed, a needed dynamic reaction takes place at the tow point as soon as there is a control deviation in the height. The height leveling system adjusts the screed's tow point in such a way that the height deviation from the reference at the position of the height sensor (in the region of the screed auger) is compensated as quickly as possible. At this position, the height to the reference is thus maintained exactly. However, the decisive height at the rear edge of the screed can change over this point (height sensor in the region of the screed auger) so that ultimately a different height is set at the rear edge of the screed compared to the desired height reference value over time. Thus, the height of the screed's rear edge changes in relation to the reference, which in turn represents a deviation from the desired height and which is not compensated for by the leveling system.

A measuring system for a leveling system is shown, for example, in U.S. Pat. No. 5,356,238.

Practical experience also shows that with the leveling systems commonly used today, undesirable height deviations in the screed occur sometimes. Therefore, there is need for an improved approach.

Embodiments of the present invention provide a controller of a road machine having a screed configured to adjust a tow point of the screed. The controller includes a first control loop and a second control loop. The first control loop varies the tow point in dependence on a first sensor value, while the second control loop varies the tow point in response to a second sensor value. The first sensor value represents a distance (from the sensor) to a ground or reference in the region of the screed, while the second sensor value represents a distance (from the sensor) to the ground or reference in the region of the tow point.

According to embodiments, the first control loop considers a first set value during variation, while the second control loop considers a second set value during variation.

Embodiments of the present invention are based on the finding that splitting the controller into two control loops takes into account the situation where different disturbance variables act on the leveling. For example, the control loop which controls in the region of the tow point compensates disturbance variables acting directly on the chassis. For example, this control loop can be implemented to be less inert than the other control loop in order to counteract the disturbance variable accordingly. The control loop, which determines its measuring values in the region of the screed essentially, compensates for the disturbance variables acting on the screed. These disturbance variables interact not only between the chassis and the tow point, as in the case in the second control loop, but also via the screed, including the "asphalt" mechanism, so that a more inert control loop can be used as a basis here. Dividing the two control loops increases the complexity of the controller, but allows disturbance variables to be controlled more individually and significantly better.

According to embodiments, the first control loop is configured to be more inert than the second control loop. For example, according to embodiments, each control loop may include a filter (first control loop first filter and/or second control loop second filter). According to embodiments, the first control loop is implemented for low-frequency control and has, for example, a low-pass filter with a low cutoff frequency. The second control loop can, for example, be implemented for high-frequency or higher-frequency control and comprise a low-pass filter with a higher cut-off frequency.

In the first control loop, a model is used to represent the transmission behavior of the screed according to embodiments. According to embodiments, this model can take into account a speed or distance traveled by the construction machine. According to further embodiments, the model may take into account a screed rotation about the longitudinal axis, a weight of the screed, and/or a tamper or vibration frequency of the screed. According to further embodiments, the model may account for a viscosity and/or a temperature of the layer or pavement to be applied. Furthermore, factors such as an angle of repose or a material height in front of the screed may also be taken into account. In this respect, the first control loop according to embodiments uses the model, which has as an input variable a speed, screed rotation around the longitudinal axis, viscosity and/or temperature.

According to further embodiments, the first control loop and the second control loop are configured to take into account a transmission behavior of the tow point adjustment and/or a transmission behavior of the screed. According to embodiments, the transmission behavior of the tow point adjustment can be described by an IT behavior (integral behavior with time component). The transmission behavior of the screed, for example, can be described approximately by a $PT_2$ behavior (proportional behavior with time component and a $2^{nd}$ order delay).

With regard to the sensors, it should be noted that, according to embodiments, these can be implemented as ultrasonic sensors or as laser sensors or as radar sensors or quite generally as distance sensors, which in the simplest case measure the distance to the ground or the applied layer. Of course, it would also be conceivable to measure relative to a reference (e.g. rope, edge or curb, line). It would also be conceivable to use a total station as a sensor system or laser receiver in combination with a central transmitter (3D control).

Another embodiment relates to a screed control system with a controller as explained above and an actuator for tow point adjustment.

According to embodiments, the screed control system has or is connected to a first sensor in the region of the screed and a second sensor in the region of the tow point.

Another embodiment relates to a construction machine, in particular a road construction machine with a corresponding controller or screed controller.

Another embodiment provides a method for controlling a road construction machine having a screed. The method comprises the steps of: adjusting a tow point of the screed using first and second control loops, varying the tow point in the first control loop in dependence on a first sensor value; and varying the tow point in the second control loop in dependence on a second sensor value. The first sensor value represents a distance to the ground or to a reference. The second sensor value represents a distance to the ground or to the reference.

According to further embodiments, the method may be computer-implemented.

Before embodiments of the present invention are explained below with reference to the accompanying drawings, it should be noted that all of the above aspects can be used in combination according to a variation. For example, the measuring system according to aspect 1 may serve as a sensor arrangement for the controller of aspect 3. Likewise, this measuring system of aspect 1 can serve as a sensor arrangement for the measurement methodology of aspect 2. Advantageously, the measurement methodology of aspect 2 can be connected to the controller of aspect 3, since typically the same points on the ground are scanned here. Of course, according to another embodiment, all three aspects can be combined. All three aspects pursue a common goal, i.e. to improve the leveling and/or control of a road construction machine (in particular a road finishing machine or a road milling machine).

BRIEF DESCRIPTION OF THE DRAWINGS

Embodiments of the present invention will be detailed subsequently referring to the appended drawings, in which:

FIG. 1k-1n show schematic representations of distances between sensor heads at a portion;

FIGS. 1o and 1p show schematic representations of ripples generated by applied layers to illustrate different numbers of sensors;

FIGS. 1q to 1v show schematic representations of arrangements for reference measurement;

FIG. 3e shows a schematic representation illustrating the disturbance variables acting on the screed-tow arm system to explain embodiments;

DETAILED DESCRIPTION OF THE INVENTION

Figure 1A:
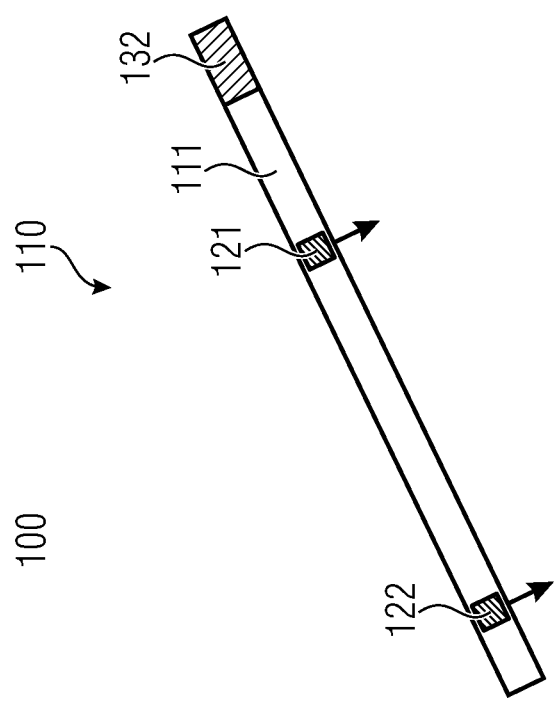
FIG. 1a shows a schematic representation of a portion with sensor heads for a measuring arrangement according to embodiments.

Embodiments of the present invention are explained below with reference to the enclosed drawings. Here, elements and structures having the same effect are to be provided with the same reference numerals so that the description thereof is mutually applicable or interchangeable.

Aspect 1

Referring to aspect 1, a sensor arrangement 100 is explained below. In its simplest implementation, it comprises a carrier 110 which comprises at least one portion 111. At least two sensors 121, 122 are integrated (generally attached) in this portion 111. These sensors are arranged to be spaced apart from each other. Furthermore, the carrier 110 comprises a second connecting element 132, which is connectable to a first connecting element (not shown). The connecting element 132 and the first connecting element (not shown) are configured to form, firstly, a mechanical connection and, secondly, an electrical connection. An electrical connection is understood to mean, for example, a contact connection, a non-contact connection, such as an inductive connection. The carrier 110 and thus also the portion 111 can, for example, have a square shape (cf. carrier portion 111 of FIG. 1f). As can be seen in particular from FIG. 1f, the integrated sensor elements 121, 122 etc. are integrated in the carrier and are all aligned in the same direction.

Assuming the installation situation of the carrier 110 parallel to the ground and further assuming that the sensor arrangement 100 is to be used to measure a distance to the ground, all sensor heads 121, 122 etc. are oriented towards the ground. In other words, they have a scanning range extending perpendicularly to the longitudinal axis of the carrier 110 or portion 111.

By integrating the sensors 121 and 122, integration meaning that they can be fully embedded in the tube of the portion 111 or simply connected to it, the assembly effort is reduced considerably since only the portion 111 is mounted at the construction site and not the individual sensor heads. In other words, this means that the sensor heads 121 and 122 can be transported together with the portion 111. The portion 111 of the carrier can be connected either to a receptacle device on the construction machine or to another portion via the interface 132, as shown, for example, in FIG. 1b.

Figure 1B:
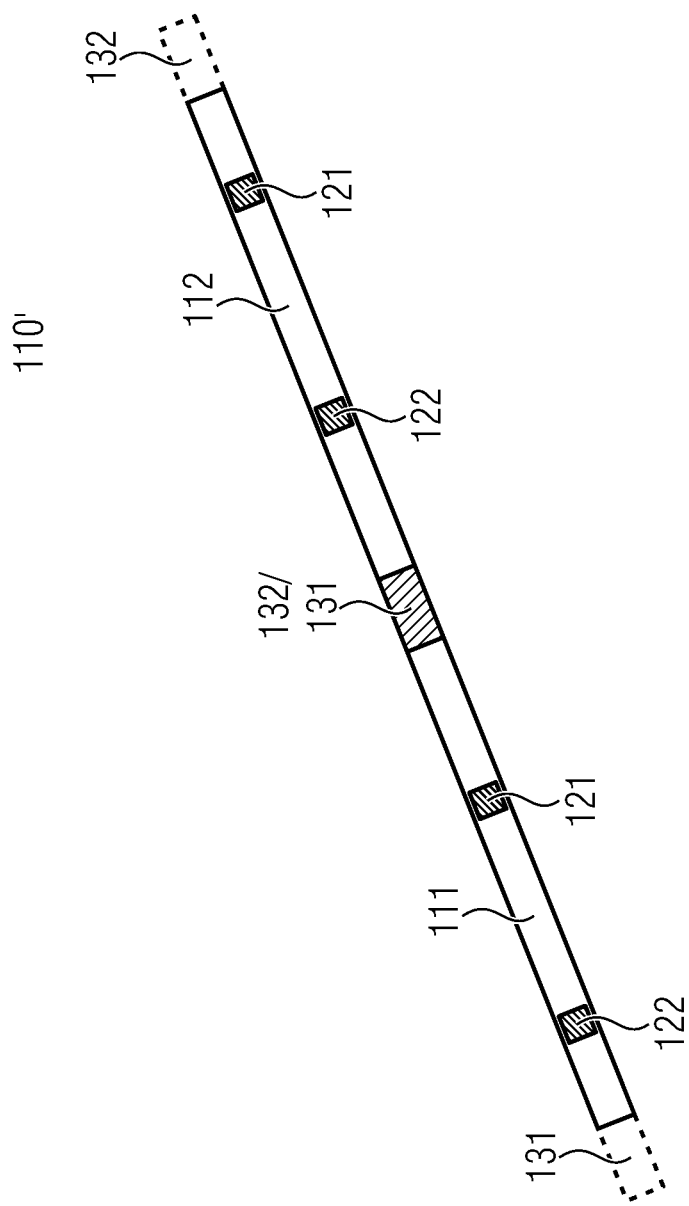
FIG. 1b shows a schematic representation illustrating the cascading of multiple carriers in a measuring arrangement according to further embodiments.

FIG. 1b shows a carrier 110' with a portion 111 and a portion 112. Each portion comprises embedded sensor heads 121 and 122. The connection between the two portions 111 and 112 is made via connecting elements 131 and 132, which are compatible with each other and are each arranged on the end face. For the sake of completeness, it should be noted that, according to optional embodiments, each portion 111 and 112 may also have further connecting elements 131 and 132 on the respective opposite end face.

With reference to FIGS. 1a and 1b, it should be noted that the carrier 110 can, for example, consist of one portion 111 or also of a plurality of portions 111 and 112. Different installation situations are explained below with reference to FIGS. 1c and 1d.

Figure 1C:
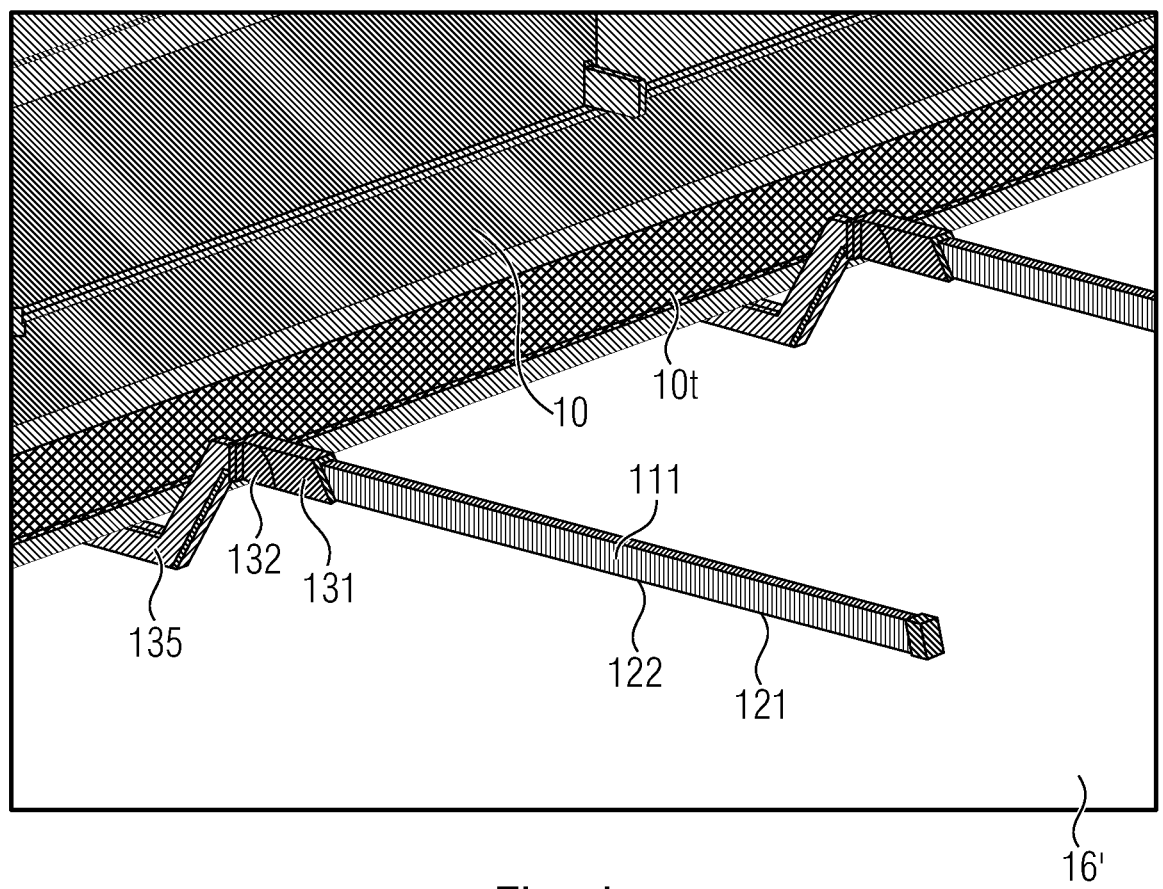
FIG. 1c-1e show schematic representations for the application of the measuring arrangement to a road finishing machine according to further embodiments.

FIG. 1c shows the portion 111, which here comprises the connecting element 131. The connecting element 131 is connected to a connector 135 comprising the connecting element 132. The connector 135 is coupled to the machine. In this embodiment, to the screed 10. The connector 135 in this embodiment extends longitudinally rearward in the direction of travel in an s-shape below the footboard 10t of the screed 10. The sensor heads 121 and 122 are shown by way of example. As can be seen, these are oriented in such a way that scanning of the ground 16' or, in this case, of the applied material layer 16' takes place.

For example, the portion 111 may be one or two meters long, or generally in the order of 50 to 300 cm. According to further embodiments, in order to be able to scan a longer region in total, it is possible to cascade the carrier 110 by connecting two portions 111 and 112. This is shown in FIG. 1d.

Figure 1D:
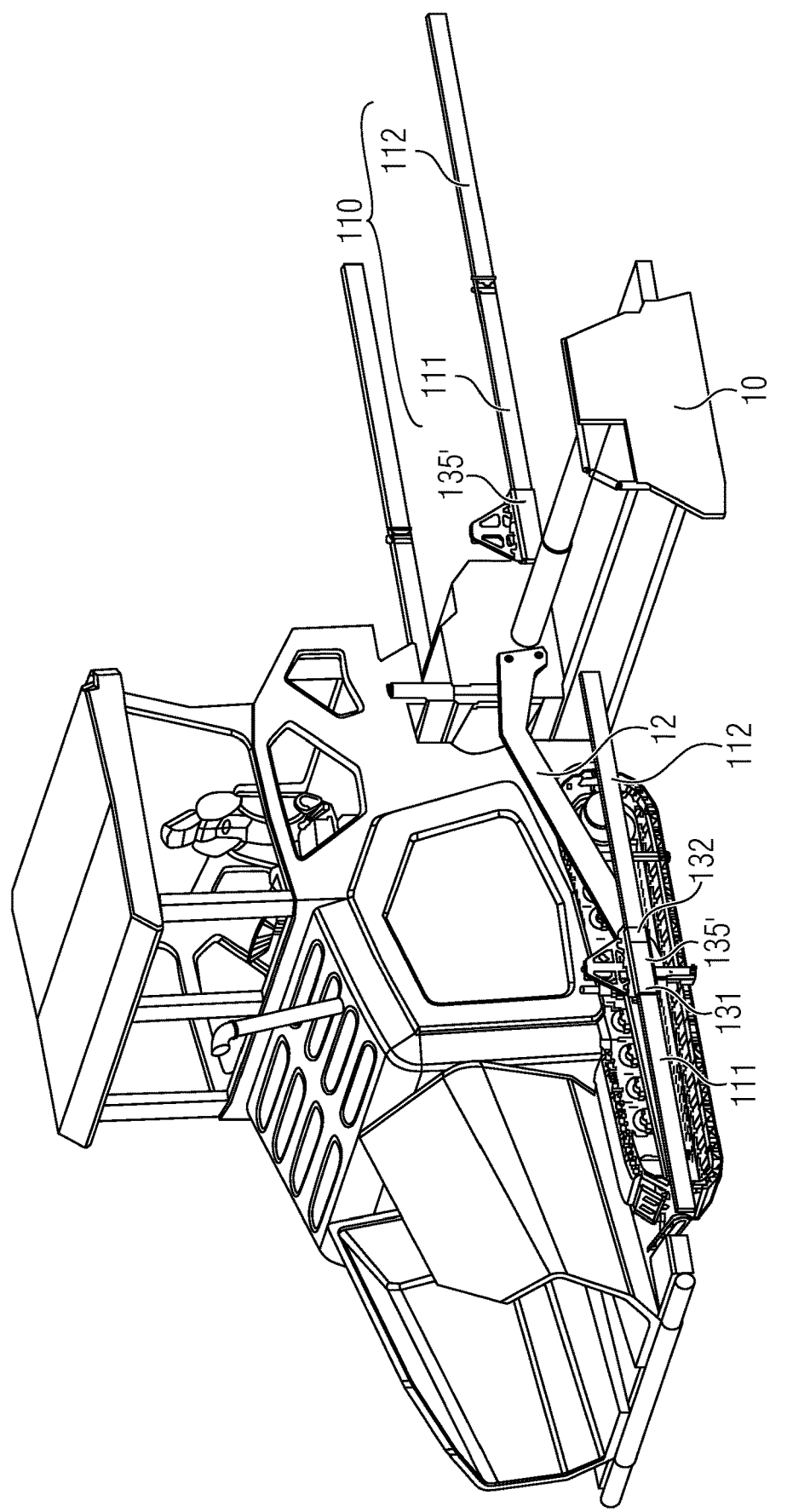

FIG. 1d shows a portion 111 connected to a portion 112 in an aligned manner. The two portions 111 and 112 together form the carrier 110 of the sensor arrangement. The sensor arrangement 110 is connected to the screed 10 via a connector 135' such that the sensor arrangement 110 extends backwards from the screed in approximately the direction of travel. By combining two portions 111 and 112, a longer region can be scanned while optimizing handling, particularly in assembly and disassembly. This is achieved by the fact that the portions 111 and 112 are separable from each other and can thus be stowed individually. When setting up such a long sensor arrangement 110, only the portion 111 needs to be connected to the element 135 and the portion 112 to the portion 111. As already explained in connection with FIGS. 1a and 1b, the connecting elements 131 and 132 are configured in such a way that, in addition to the mechanical connection, an electrical connection is also formed. In this respect, no additional wiring is needed for contacting the portion 112, which reduces the assembly effort considerably.

FIG. 1d shows another exemplary installation situation at the tow arm 12. A further holder 135' is arranged at the tow arm 12, which has both a first connecting element 131 and a second connecting element 132. The sensor arrangement 110' comprises two portions 111 and 112, with both portion 111 being connected to the connector 135' via its connecting element 132 and portion 112 being connected to its connecting element 131. In other words, the element 135', which is firmly connected to the machine or to the tow arm 12 of the machine, is located between the two portions 111 and 112 of the carrier. Both portions are oriented in the same way, as in the case of the sensor arrangement 110 of FIG. 1*d*, so that scanning of the ground or of the applied layer takes place.

Figure 1E:
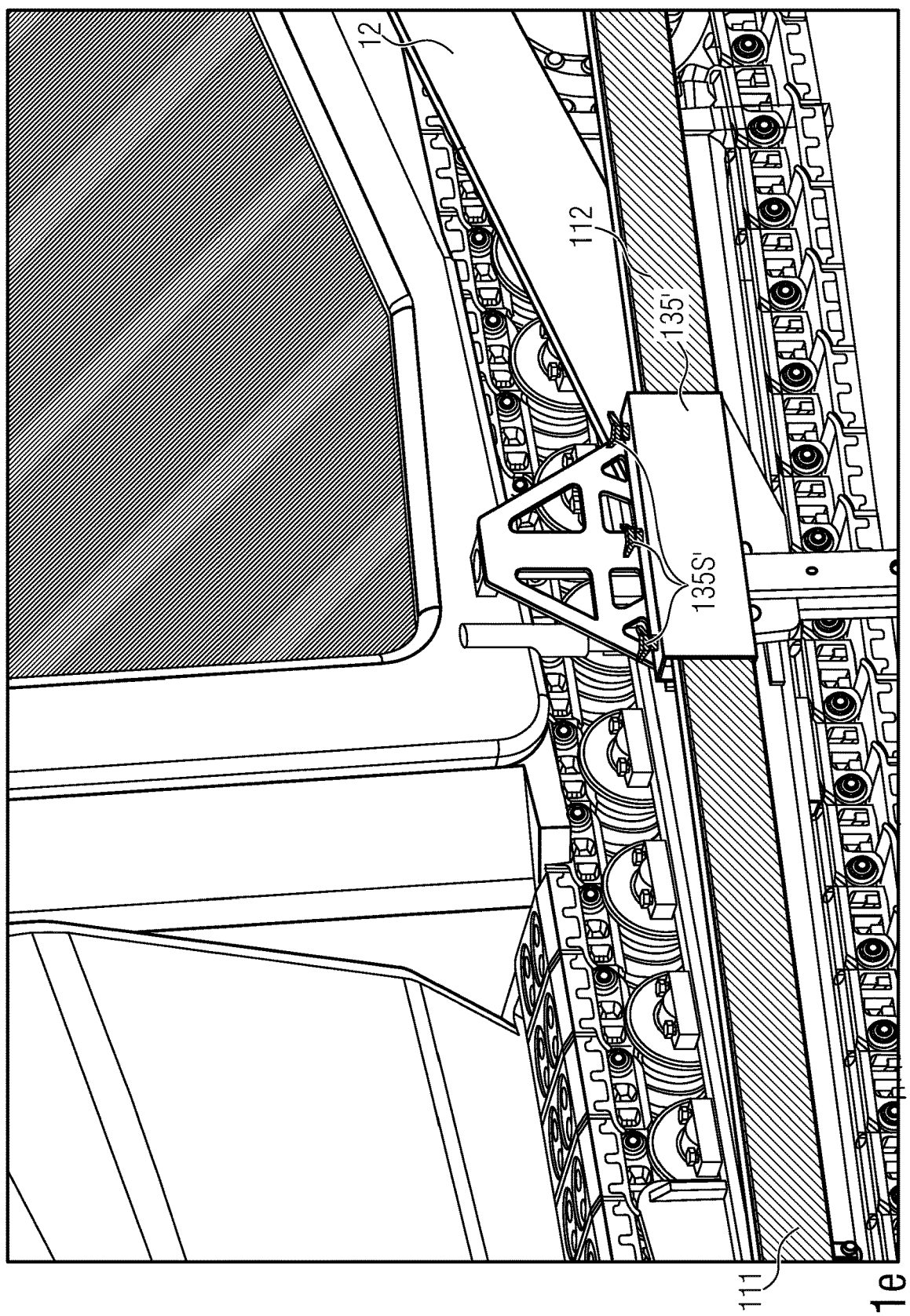

This embodiment has thus shown that not only cascading by series connection, as in the arrangement 110, but also cascading by common connection to a common connector 135' is possible. Via this cascading, it is of course also possible for the measuring system to have a third portion which is arranged in series, for example. Furthermore, this embodiment has shown that different attachment positions are possible, for example on the screed 10 itself or on the tow arm 12. It is important that the element 135' is each fixedly connected to the screed 10 or the tow arm 12. Screw connections, welded connections or other connections are suitable for this purpose. For example, this element 135' can remain directly connected to the machine while the technology-carrying sensor elements/portions 111 and 112 are disassembled at night. The element 135' of the sensor arrangement 110' is shown in FIG. 1*e*. FIG. 1*e* shows the element 135', in which the portion 111 is connected on the first side and the portion 112 is connected on the second side. In this embodiment, the connecting element 135 is formed as a kind of sleeve, which corresponds in its cross-sectional shape to the cross-section of the profiled 111 and 112 (here rectangular, alternatively other e.g. round cross-section), wherein the dimensioning, in particular the internal dimensioning of the sleeve of the element 135', is formed in such a way that the elements 111 and 112 can be inserted. By means of the screws 135*s'* shown here, he elements 111 and 112 can be fixed. The electrical connection is not shown.

According to embodiments, the element 135' is or can be rotated relative to the tow arm 12 to align the sensor arrangement 110 or 110' parallel to the ground. At this point, it should be noted that this is not absolutely necessary, since computational corrections are also possible here with the principle of using a regression line, which will be explained in connection with aspect 2.

According to embodiments, the portions 111 and 112 extend substantially in alignment for both the sensor arrangement 110 and the sensor arrangement 110' such that all sensors 121 and 122 have a substantially parallel scan lobe.

Figure 1F:
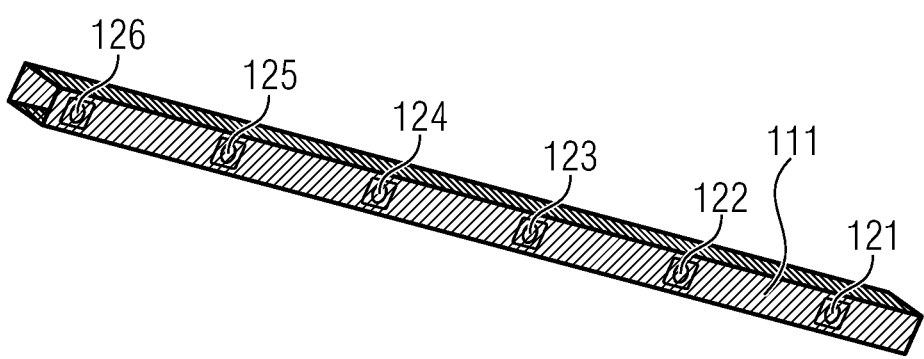
FIG. 1f shows a schematic representation of a portion according to embodiments in detail.

Referring to FIG. 1*f*, a portion 111 with its sensor arrangement is explained. The portion 111 may have a plurality of sensor heads 121 and 122, such as six sensor heads in this case. These are marked with the reference numerals 121 to 126. For example, the arrangement can be equidistant, although another arrangement may also be practical, as will be explained below with reference to FIG. 1*m*. The number can also vary accordingly (cf. explanations in connection with FIGS. 1*k* and 1*l*).

Figure 1G:
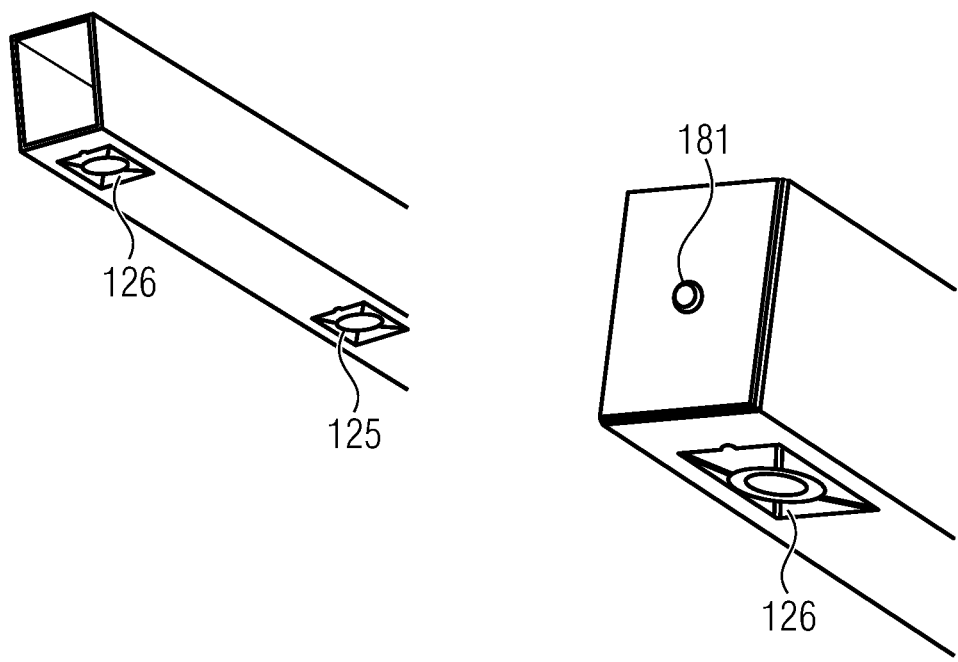
FIG. 1g shows a schematic representation of a sensor head for integration according to embodiments.

The sensor heads 121 to 126 are embedded on one side of the profile, which is rectangular in this case, as shown in FIG. 1*f* and in FIG. 1*g*. FIG. 1*g* shows an exemplary profile of 60×80 mm, with a sensor head 126 embedded on the narrower side 60. This can, for example, be clicked or screwed into place. According to embodiments, the sensor head 126 is approximately flush, i.e. +/−3 mm or +/−10 mm or +/−20 mm, with the surface of the profile.

According to embodiments, the sensor head is an ultrasonic sensor, although other sensor technologies, such as lasers or capacitive sensors, can also be used. Different measuring principles can also be used for the different sensor heads per portion 111 or per sensor arrangement 110.

Figure 1H:
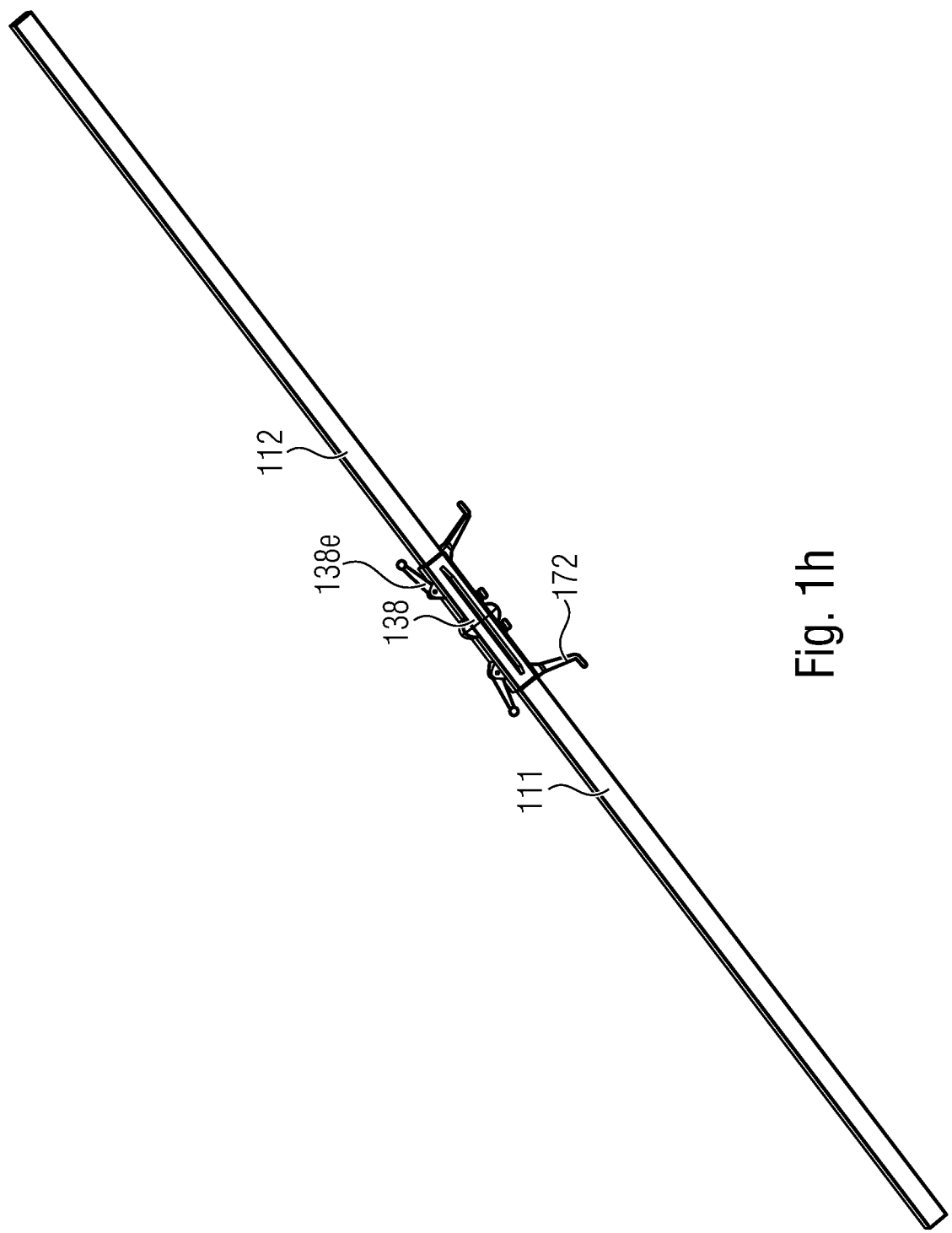
FIG. 1h-1j show schematic representations of connection options between portions or connectors and a portion.

FIG. 1*h* shows the two portions 111 and 112 connected to each other by a connector 138. The portions 111 and 112 are simple profiles which are inserted into the connector 138 and connected by means of the eccentric 138*e* on each side. The profiles have the connecting elements 131 and 132 at the corresponding end faces at which the connection to the connector 138 is made, the connector 138 having the corresponding counterparts to form the electrical connection in addition to the mechanical connection. In this embodiment, the electrical connector may be realized, for example, by a plug integrated in the connector 138 and closed in the longitudinal direction of the portions 111 and 112.

Figure 1I:
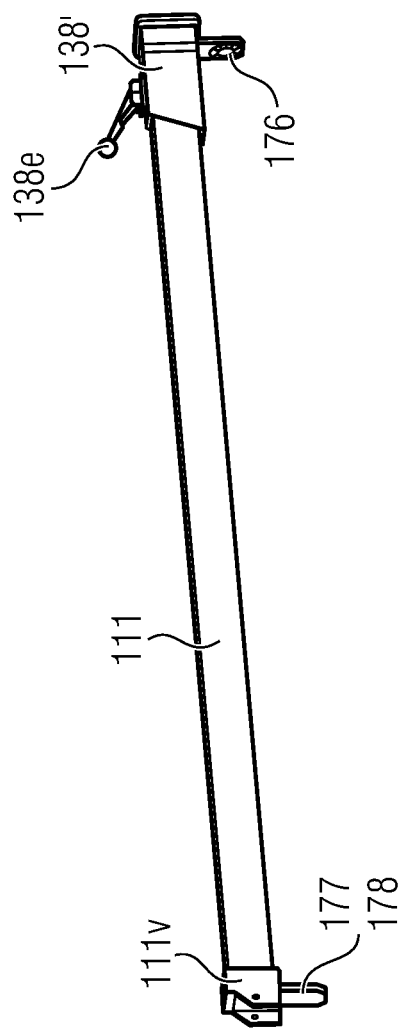

Another embodiment of a slide-in connector is shown in FIG. 1*i*. Here, a modified connecting element 138' with the eccentric 138*e* is shown, into which the portion 111 is inserted. The connecting element 138' may, for example, belong to the further portion of the carrier or may also be permanently connected to the machine.

According to another embodiment, it would also be conceivable for, instead of the eccentric 138*e*, a screw connection to be carried out with a knurled screw, as shown in FIG. 1*e*. The common feature is that the profile 111 or 112 is inserted and fixed by means of a further means, such as an eccentric or a screw. It would also be possible to use some sort of quick-release fastener, as is common in bicycles, or a bayonet-type fastener. It should be noted at this point that the portion 111 can be implemented, for example, with a closure cap 111*v* on one end face.

Figure 1J:
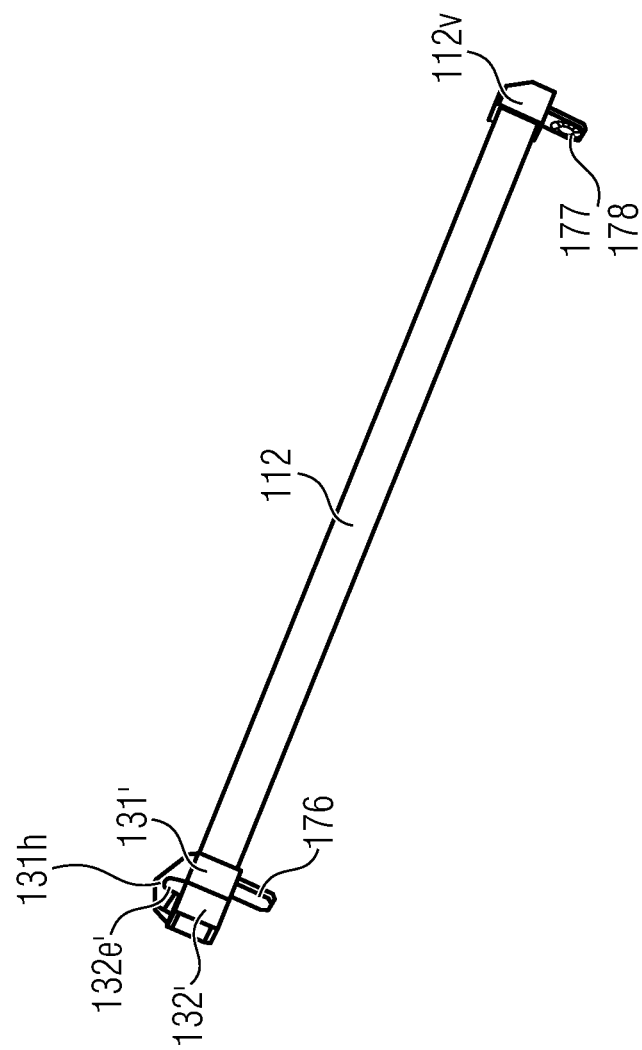

FIG. 1*j* illustrates another connection concept. In this embodiment, the portion 112 has a kind of hook 131*h'* as a connecting element 131' so that the hook is connectable to an engaging portion of the connecting element 132'. The engagement portion of the member 132' is provided with the reference numeral 132*e'*. These two members establish a mechanical connection by performing a rotor movement of the portion 112 with respect to the further member to which the portion 112 is to be connected. The electrical connection may also be carried out in this rotor connection, for example by contact at the end faces. The end face limits the rotor movement.

The element 112 has a cap on the opposite end face. The cap is provided with the reference numeral 112*v*.

It should also be noted at this point that other connection options are also conceivable. For example, the respective connecting element can also have guides extending orthogonally to the longitudinal direction so that a kind of dovetail connection is formed.

All these mentioned connections have in common that a portion at a fastening element or several portions can be connected to one another, wherein an electrical connection is formed in addition to the mechanical connection. Also, the angular orientation of the longitudinal portion is fixed by the connector.

Figure 1K:
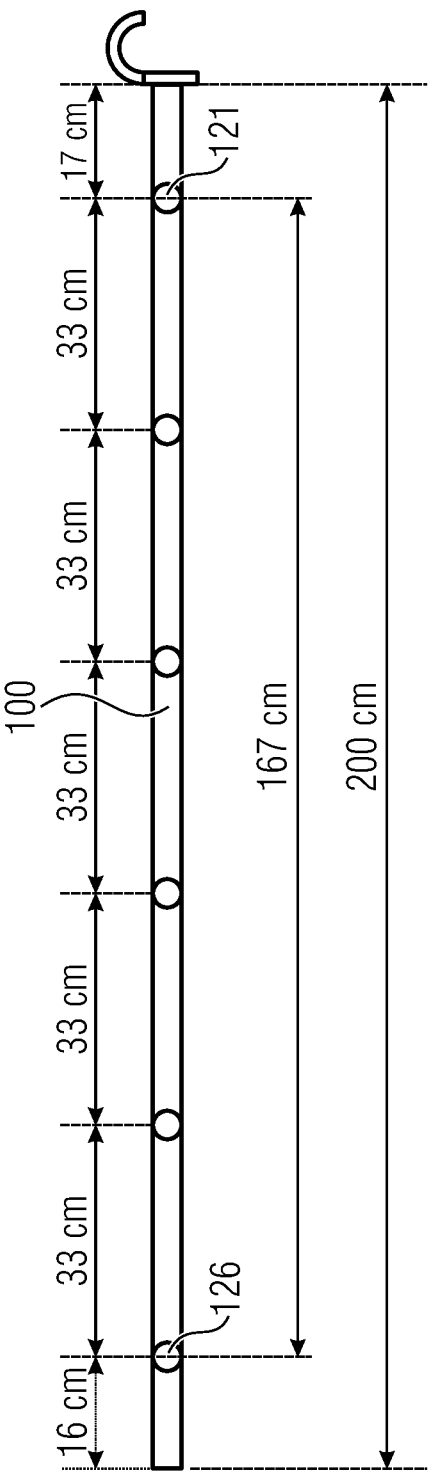
Figure 1L:
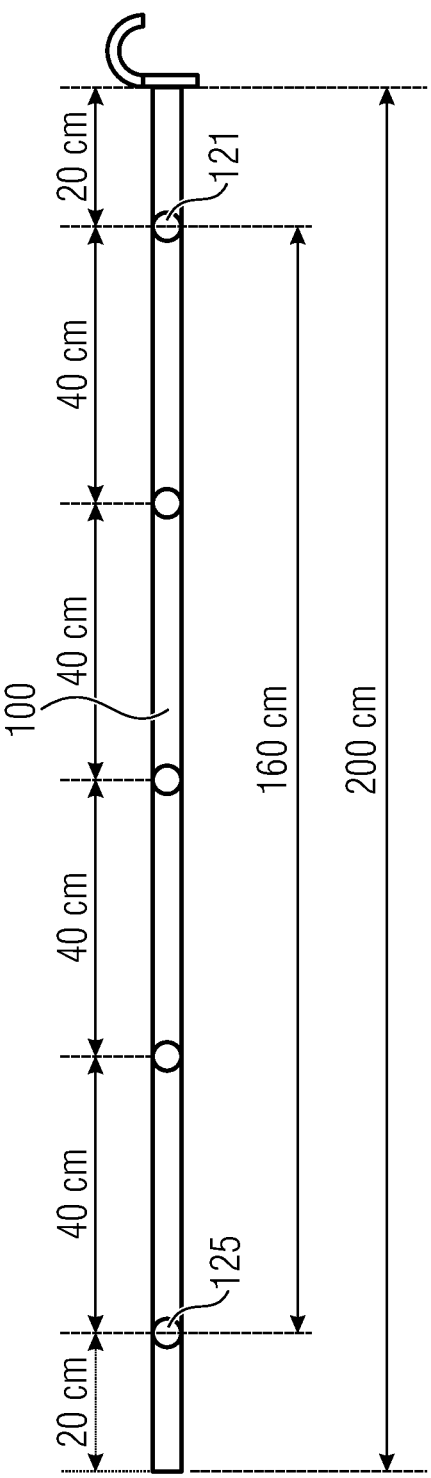

As explained above, each portion may comprise a plurality of sensor elements 121 etc. In FIG. 1*k*, it is assumed that the portion 100 has a length of 2 m (200 cm) and the sensor heads 121-126 (here six sensor heads) are distributed evenly. This results in a distance of 33 cm between the sensor heads, where 33/2 cm are provided from the end face to the first sensor head 121 and to the last sensor head 126. FIG. 1l shows a portion 100 of length 2 m (200 cm), where five sensor heads 121-125 are provided. The distance is again equidistant so that a distance between the sensor heads of 40 cm and from the end face to the first or last sensor head 121/125 of 20 cm is obtained.

Figure 10:
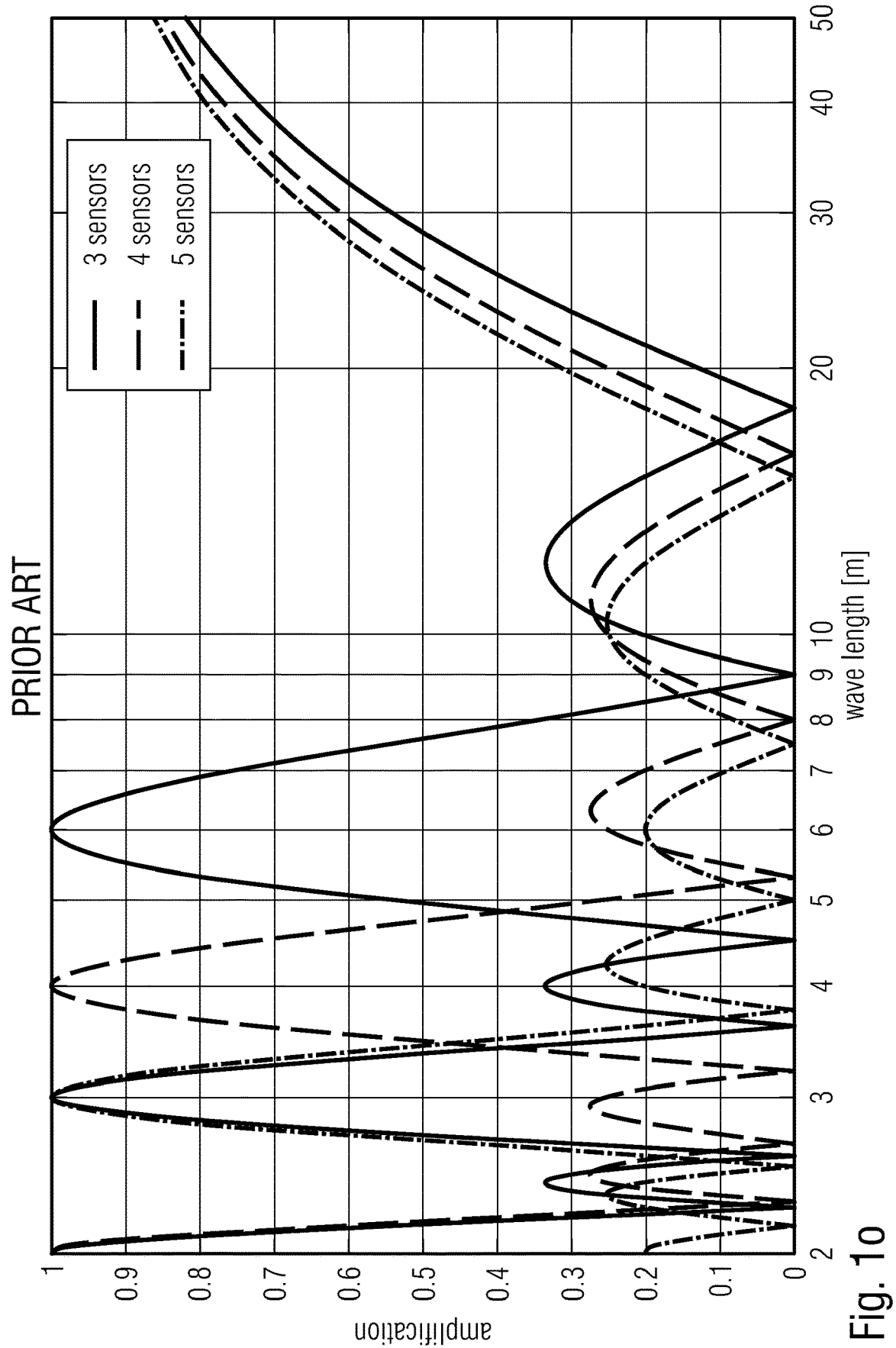
Figure 1P:
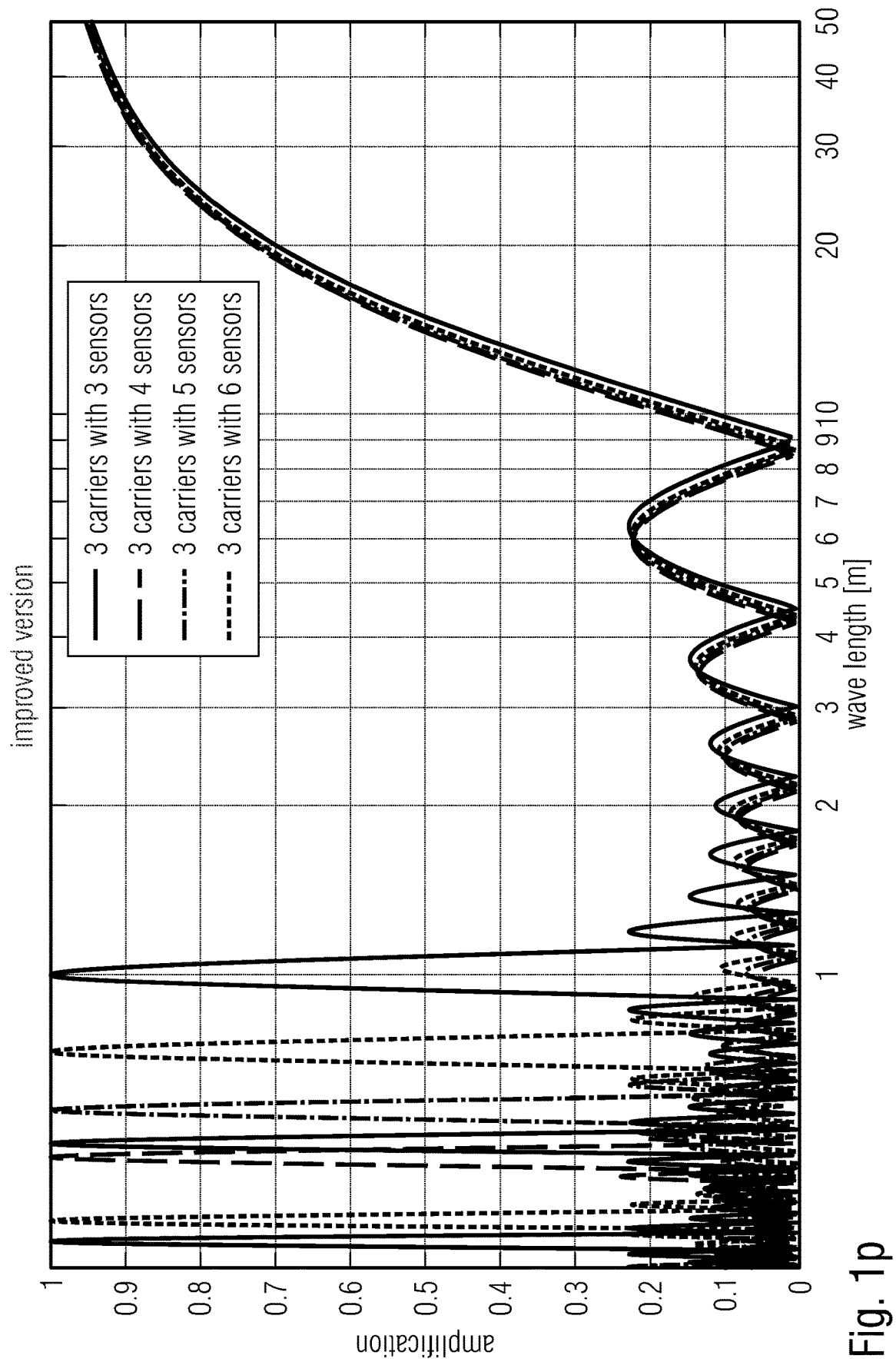

As shown in FIGS. 1*o* and 1*p*, the number of sensor heads has a significant influence on the possible control. FIG. 10 shows a comparison between a classic Big Sonic-Ski (Big Ski for short) with a 12 m extension using three, four and five sensors. As can be seen, the Big Sonic-Ski with three sensors has problems in the 6 m range, the Big Sonic-Ski with four sensors has problems in the 4 m range, and the Big Sonic-Ski with five sensors has problems in the 3 m range. The same problems are experienced by the Big Sonic-Ski with three sensors. By increasing the sensor density, these high-frequency problems (compared to vibration) can be reduced in the range of 20 m etc. The improvement by using the sensor arrangement described in FIG. 1 (and according to the invention) is shown in FIG. 1p. Here, an 8 m carrier is assumed to have three to six sensors. As the number of sensors increases, the control gaps become more high-frequency, but this is less critical because the probability of high-frequency interference is lower.

In summary, an increase in sensor density in the longitudinal direction offers a quality advantage. All in all, it is considered that embodiments have a sensor arrangement with a length of at least 4 m, i.e. comprising two portions. Even better qualities can be achieved with 6 m or 8 m sensor arrangements.

In order to improve also high-frequency gaps or in general gaps resulting from harmonic vibrations, a non-equidistant sensor pattern per portion can also be used according to further embodiments. Such examples are shown in FIG. 1m for a distance with five sensor heads 121-125. Here, the distance increases from 20 cm between the end face and the first sensor 121. For example, the distances are 32, 40, 46, and 58, and 4 cm.

FIG. 1n shows a further representation, wherein equidistant sensors with a distance of 44 cm are again used here, but the distance between the end face and the first sensor 121 is selected in such a way that an equidistance is also maintained over two portions. Here, the portion between the end face and the first sensor is selected in such a way that half of the distance is present between the further sensor or, in particular, the sensors 121 and 122.

Possible implementation examples of reference sensors are explained below with reference to FIG. 1q-v. Ultrasonic sensors are often subject to drift, e.g. as a result of ambient temperatures, and a reference measurement is to be performed for this. A reference measurement is made, for example, by measuring a known distance with an ultrasonic sensor and using this reference signal as a calibration value based on the measurement signal, typically a time period between transmission and reception of the response signal. FIG. 1q shows a portion 111 having sensor heads 121 etc. One or each sensor head has a bracket 171 arranged at a defined distance in front of the sensor 121. This bracket 171 is located at least partially in the entire measurement field and can be folded in according to embodiments or can also be of rigid design. The bracket 171 reflects the measurement signal, as shown here by means of the dashed line.

Another variation is shown in FIG. 1r. Here, a bracket is also provided at a sensor, here the sensor 125. The bracket has a reflector 172. According to embodiments, the bracket is integrated in the holder 131', here a hook holder (cf. FIG. 1j). The reflector 172 is located at a defined distance from the sensor 126 and can thus be used for reference measurement.

Figure 1S:
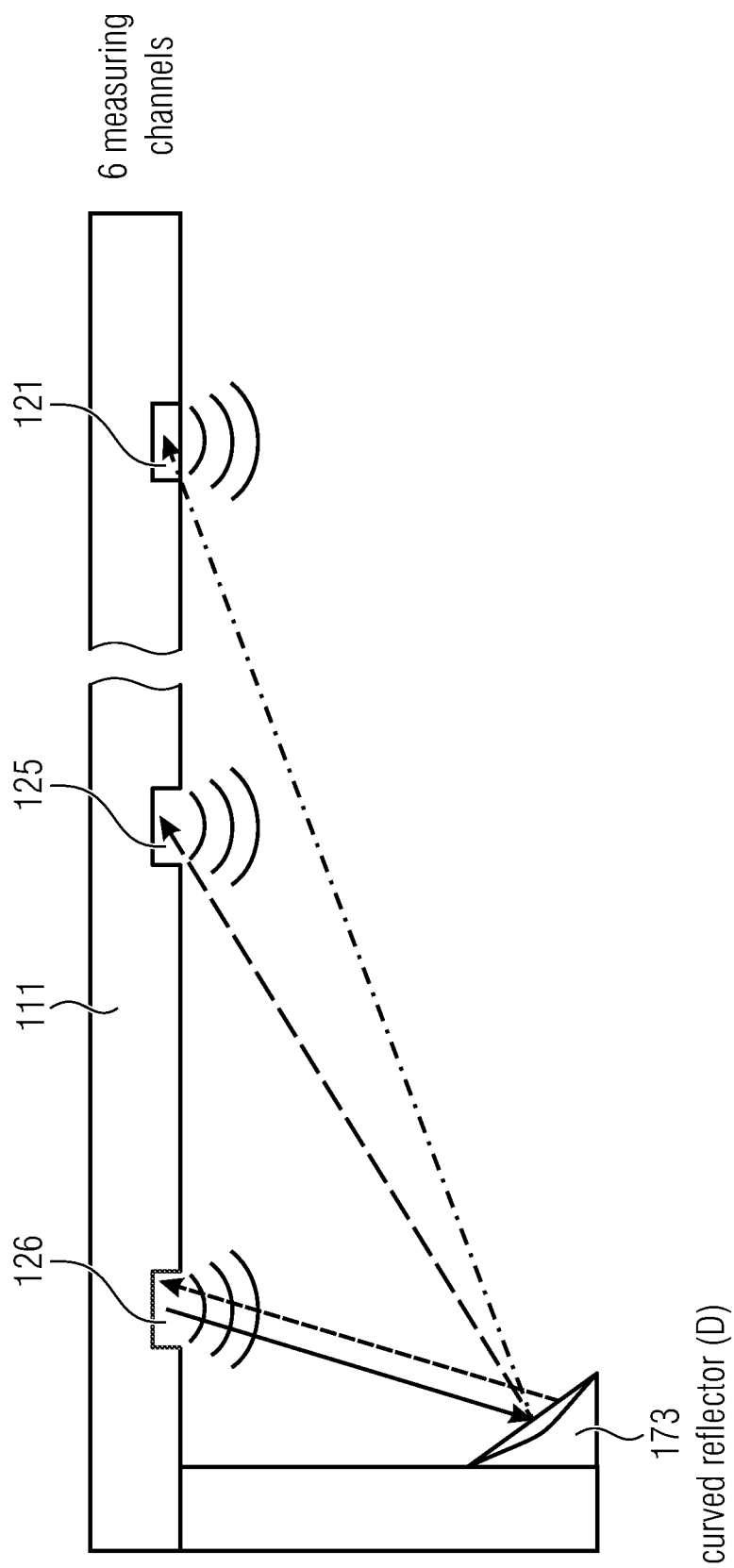

FIG. 1s shows a further variation, wherein a further reflector 173 is provided in a laterally arranged bracket which extends approximately perpendicularly to the longitudinal extension of the portion 111. This reflector 173 is arranged at a distance from the sensors 126, but serves not only as a reference for the closest sensor 126, but also for the sensors 125, . . . 121 arranged next to it. According to embodiments, the reflector 173 may be arranged at an angle, e.g. 45° with respect to the measuring direction of the individual sensor heads 121 to 126. According to further embodiments, the reflector surface 173 may be curved to serve as a reflector for all channels 121 to 126. As shown herein, the bracket connecting the reflector 173 to the portion 111 may be either attached directly to the portion 111 or may be integrated in the connecting element, as shown, for example, in connection with FIG. 1r.

Figure 1T:
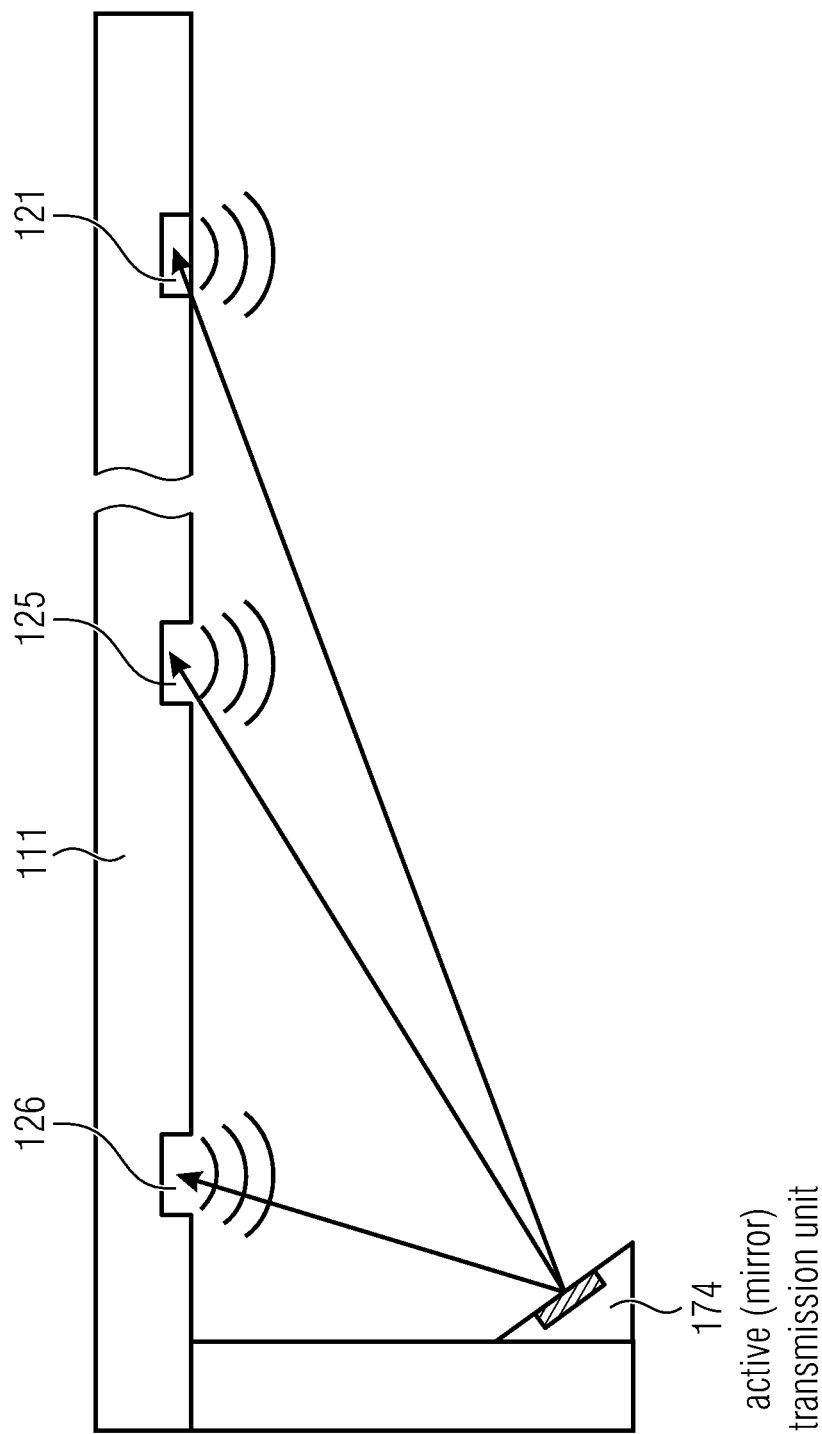

FIG. 1t is essentially similar to the embodiment in FIG. 1s, although here the reflector 174 has an active mirror which aligns itself accordingly depending on which channel (sensor head) is to be calibrated.

Referring to the embodiments of FIGS. 1s and 1t, it should be noted that, for example, sensor heads 121 to 126 can be calibrated one after the other so as not to interfere with one another.

In accordance with further embodiments, it would also be conceivable for the active reflector 174 to be an active transmitter unit, which then directs an ultrasonic signal to the receivers 121 to 126.

Figure 1U:
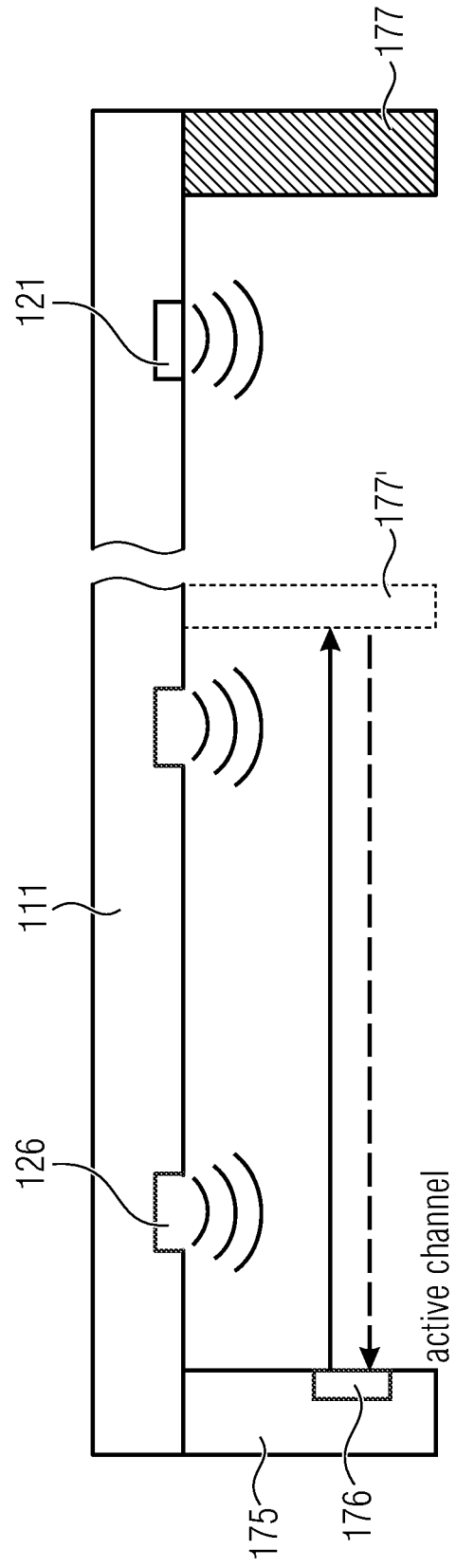

In the embodiment of FIG. 1u, it is assumed that an ultrasonic sensor 176 is used for reference measurement by means of a bracket 175 arranged below the sensor heads 121 to 126. Below here means between the carrier/portion 111 and the road surface. The ultrasonic sensor 176 is arranged parallel to the carrier/portion 111 and can be arranged, for example by means of an additional reflector 177, on the other end face or also between the end faces, for example in the center (cf. dashed element 177').

Figure 1V:
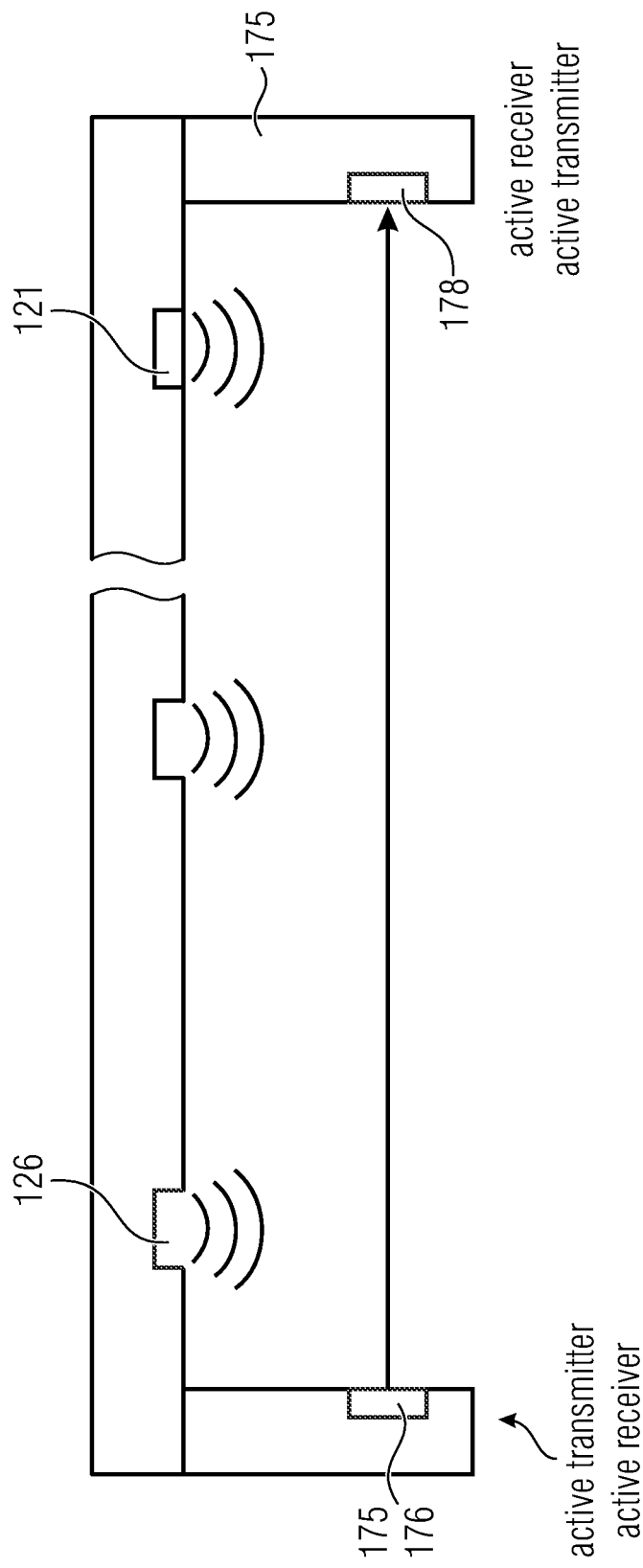

According to another variation shown in FIG. 1v, the active transmitter 176 arranged on the bracket 175 can cooperate with an active receiver 178 arranged on a bracket 175 on the other end face.

All the embodiments have in common that the reference measurement takes place in the region of the ultrasonic sensors 121 to 126. This has the advantage that the same ambient conditions prevail here, e.g. ambient temperature and infrared radiation.

All possibilities of reference measurement by means of reflectors arranged on the end faces, by means of active transmitters or receivers arranged on the end faces, or by means of transmitters or receivers arranged on the end faces, which form a parallel signal, for example, can be implemented in such a way that the connecting elements, which are welded to the profile or arranged on the profile in general, for example, have these reflectors or transmitters integrated. In this context, reference is made to FIG. 1h, which shows a reflector comparable to the reflector 172 of FIG. 1r integrated into the profile connector. In this respect, the element for carrying out the reference measurement is not part of the portion 111 or 112 at all, but of the connector 138. Another variation, which follows, for example, the measurement principle shown in FIG. 1v with active transmitter 176 and active receiver 178, is shown in FIG. 1i. An active transmitter 176 is integrated here into the element 138', while the receiver 178 is integrated into the closure cap 111v. In this embodiment, it would of course also be conceivable for a reflector 177 to be used instead of the receiver 178. A similar variation is shown in FIG. 1j. The transmitter 176 here is integrated into the element 131', while the receiver or reflector 177 and 178 is integrated into the closure cap 112v. Of course, it would also be conceivable for 176 to be interchanged with 177/178 in the embodiments of FIGS. 1i and 1j.

In all embodiments, it is advantageous for measurements of the sensor heads to be performed substantially simultaneously (synchronous measurement within a time window, e.g. within a time window of 3 s, 1 s, 0.5 s, 0.1 s or smaller). That is, it is advantageous for all the sensor heads arranged in the measuring system to perform measurements essentially simultaneously. This means that a simultaneous measurement in principle provides a snapshot of, for example, the ground or reference profile (the layer already applied or the ground for the layer to be applied) and the reference measurement(s) under the same conditions (for example, environmental conditions such as ambient temperature). Thus, a correct reference profile or correct profile of the ground is acquired from all the sensor heads in all the portions and all the carriers of the measuring system. A substantially simultaneous measurement is also of advantage with regard to a high measurement rate (sampling rate), as is nowadays needed for leveling in road construction (for example, height leveling of the screed).

Referring to FIG. 1g, another feature is explained. In FIG. 1g, an end face LED 181 is also indicated. This can indicate, for example by color coding or flashing, whether the electrical connections between portions or from portion to machine are correct. Furthermore, information such as readjustments needed can also be displayed. Furthermore, it would also be conceivable for the LED, when arranged, for example, at the ending end face in FIG. 1d of the measuring arrangement 110, to give signals regarding the distance to a vehicle, such as a roller, driving behind it. For this purpose, according to embodiments, a further distance sensor can also be aligned in the other direction in the end face similar to the distance sensor for reference measurement 176, which then measures the distance to a following vehicle.

According to further embodiments, instead of the LED, a complex display such as an LCD may be provided, for example to display text and/or symbols.

Aspect 2

A measuring system 200 which uses a regression line to determine a position is explained below.

Figure 2A:
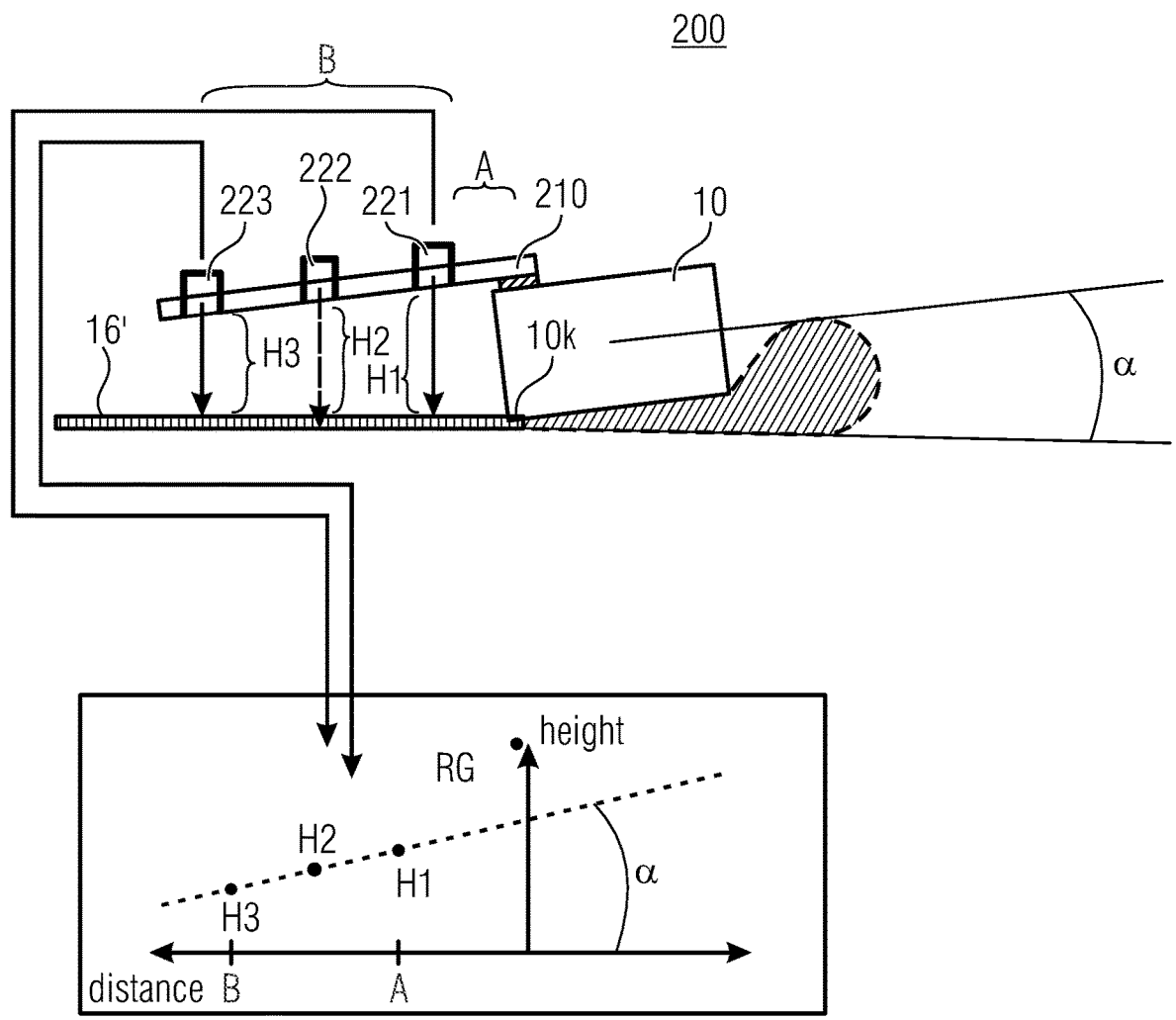
FIG. 2a shows a schematic representation of a layer thickness measuring system using a regression line according to an embodiment.

As in the embodiment of FIG. 2a, the measuring system 200 comprises a carrier 210 arranged, for example, on a component such as the screed 10 of the construction machine. As shown here, the component 10 is tilted, for example, by an angle $\alpha$. Exemplarily, the carrier extends backwardly or even forwardly (not shown) from the component 10. The carrier 10 is further fixed to the component and thus changes its angular orientation in space according to the angle $\alpha$.

Three sensor heads 221 and 222 and 223 are provided on the carrier 210. Although it is not important for the calculation at first, it should be noted here that the sensor head 221 is located closer to the screed edge 10k, which represents a pivot point 10 of the screed, than the sensor 223. The sensor head 222 is located in the middle or in between. For example, the distance to the perpendicular foot point on the screed edge 10k may be denoted by A, while the distance on the perpendicular foot point of the screed edge 10k to the sensor 223 is denoted by B. In general, it should be noted that, as an alternative to the pivot point around the screed rear edge 10k, the screed 10 can also have a different pivot point, e.g. in front of the screed rear edge 10k (in particular if it rests on hot asphalt). In this case, for example, the distances to the pivot point are then taken into account accordingly.

The sensors 221, 222 and 223 are arranged substantially parallel and measure a distance from the carrier 110 to the ground, in this case the applied layer 16'.

Based on the angle $\alpha$, the distance H1 is greater than the distance H3. The sensor values can, for example, be recorded in a two-dimensional space, here height over distance. Based on the sensor values, it can be seen that the regression line RG also runs according to the angle $\alpha$. If it is in the two-dimensional space, the regression line RG can be determined in such a way that the angle $\alpha$ can be determined computationally. By determining the angle $\alpha$, the position of the component 10 relative to the ground is also known.

It should be noted at this point that the position a does not necessarily have to be an absolute position, but can in particular be a relative position with respect to the ground.

Referring to the distances A and B, it should be noted that if there are two sensor values, these do not matter, it is much more important that the position of the sensors 221, 222 and 223 to one another is known. Of course, the same is also true for more than two sensors to determine the height values in the two-dimensional space.

If, for example, the screed height changes, the values H1 and H also change3, wherein, starting from a parallel displacement, the angle $\alpha$ remains constant. Thus, if there are slight variations in the values due to vibrations, for example, these values can be plotted in the common space and a regression line RG can be determined. This represents averaging. The use of more than three sensors also results in averaging if all sensors are arranged exactly on the carrier 210.

Figure 2B:
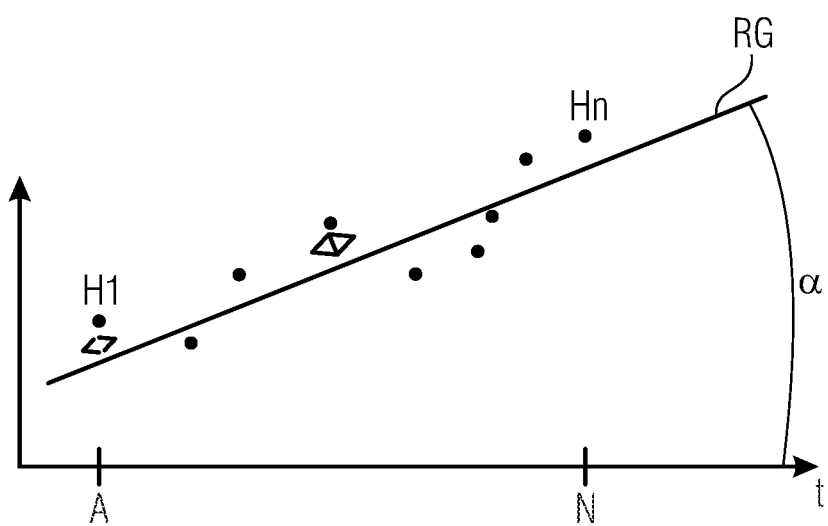
FIG. 2b shows a schematic representation of the three-dimensional space for explaining the determination of a regression line with a multitude of distance points.

Referring to FIG. 2b, the determination of the regression line RG for a point cloud is explained. In this embodiment, it is assumed that more than two sensors are provided. For example, the sensor array from aspect 1 can be used. The deviations, as shown here based on the height points H1 to Hn, can originate, for example, due to unevenness in the ground. Essentially, however, the height values increase from a to n, so that this can be conveyed here in the regression line RG. For example, the regression line RG is placed in such a way that the distance between the regression line RG, represented here by small arrows, and the measuring points becomes minimal in total.

Here, too, the regression line is angled with respect to the distance axis, e.g. by the angle $\alpha$. This position can be determined and gives a conclusion as so the angle of the component.

For example, if the carrier of FIG. 2a with sensors 221, 222 and 223 is attached to the screed and arranged in the longitudinal direction, the roll angle of the screed about its longitudinal axis can be determined. If, in addition to the longitudinal component, there is a transverse component, a combination of the roll angle and the transverse inclination angle is determined. Knowing the transverse component to the longitudinal component, these two angles can be separated. The transverse component can be determined, for example, using the carrier from FIG. 2a with sensors 221, 222 and 223 if it is arranged in the longitudinal direction of the screed (i.e. transverse to the direction of travel of the machine).

According to embodiments, the carrier runs without any angular offset with respect to the component. An offset can also be taken into account. To determine the offset, for example, a calibration can be performed at the beginning or an adjustment can be made with an optional angle sensor, such as an inclination sensor.

According to embodiments, instead of attaching the carrier to the screed, the screed could also be attached to the tow arm, for example. An example of such an attachment is explained in aspect 1, as it involves attaching a carrier comprising a plurality of portions.

This carrier has a plurality of integrated sensors, which then corresponds to an averaging regression line according to the embodiment of FIG. 2b.

Figure 2C:
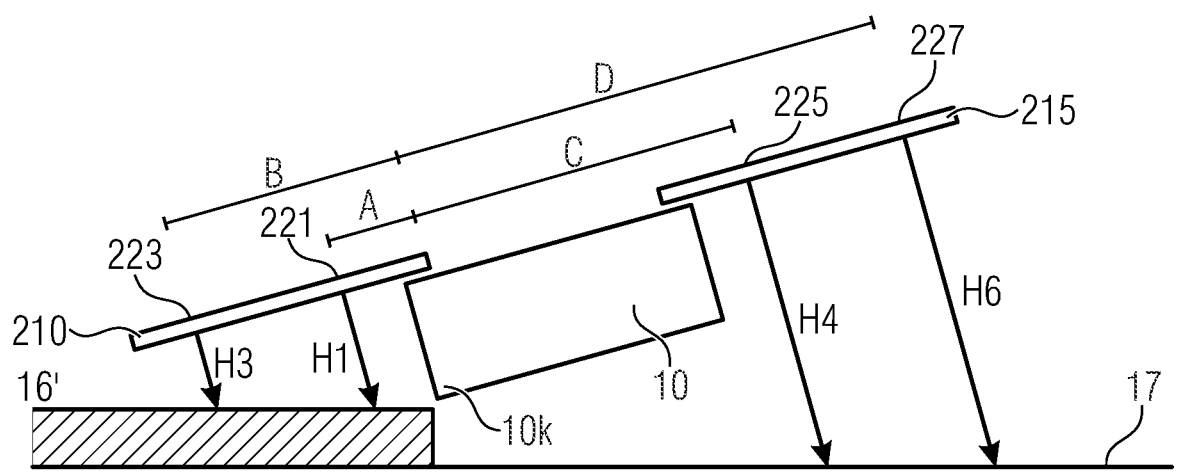
FIGS. 2c to 2e show schematic representations illustrating a layer thickness measuring system based on the determination of regression lines.

Referring to FIG. 2c, a layer thickness determination by means of the regression line is explained below.

FIG. 2c shows the use of the sensors 221 and 223 by means of the carrier 210 and the use of another carrier 215 which houses the sensors 225 and 227. As in FIG. 2a, the sensor array 210 is arranged behind the screed, while the sensor array 215 is arranged in front of the screed. Of course, an interchanged arrangement would also be conceivable. It is assumed that both extend in the longitudinal direction.

Figure 2D:
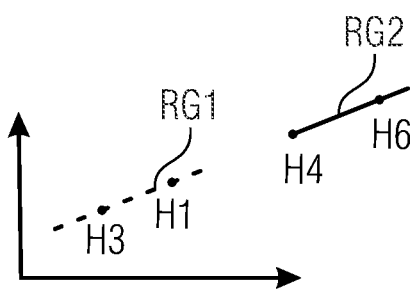
Figure 2E:
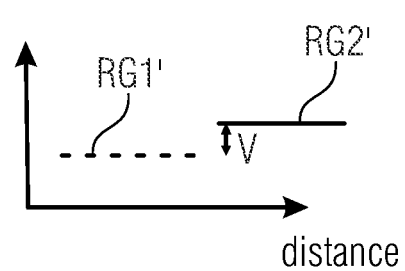

The resulting sensor values H1, H3, H4 and H6 are plotted in FIG. 2d in the two-dimensional space. This results in the two regression lines RG1 and RG2. If both regression lines RG1 and RG2 are now tilted about the screed center of rotation, namely the screed rear edge 10k, the regression lines are mapped to the corresponding RG1' and RG2', as shown in FIG. 2e. The axis distance in FIG. 2e is parallel to the ground or the reference against which measurements are made. The tilted regression lines RG1' and RG2' are now no longer in line with each other as in FIG. 2d, but have an offset V. This offset V results from the fact that the array 210 associated with the regression line RG1 measures to the layer 16' to be applied, while the sensor array 215 measures to the ground 17. In this respect, this offset depends on the thickness of the layer 16' to be applied. Conversely, this means that the layer thickness can be determined, i.e. calculated, by means of this approach.

According to embodiments, the distances A, B, C and D between the respective sensor 221, 223, 225 and 227 and the perpendicular foot point on the screed edge 10k in the rotation are used to perform the rotation.

In the above examples, it has to be kept in mind that when measuring with ultrasound, the perpendicular to the ground is measured and not the perpendicular, relative to the carrier, to the ground. In other words, the variation shown represents, for example, a measurement with a laser or the like.

For all measuring systems explained above, comparable (same) mounting heights were assumed, wherein it should be noted that these can also vary and are then corrected by calculation afterwards.

Aspect 3

Figure 3A:
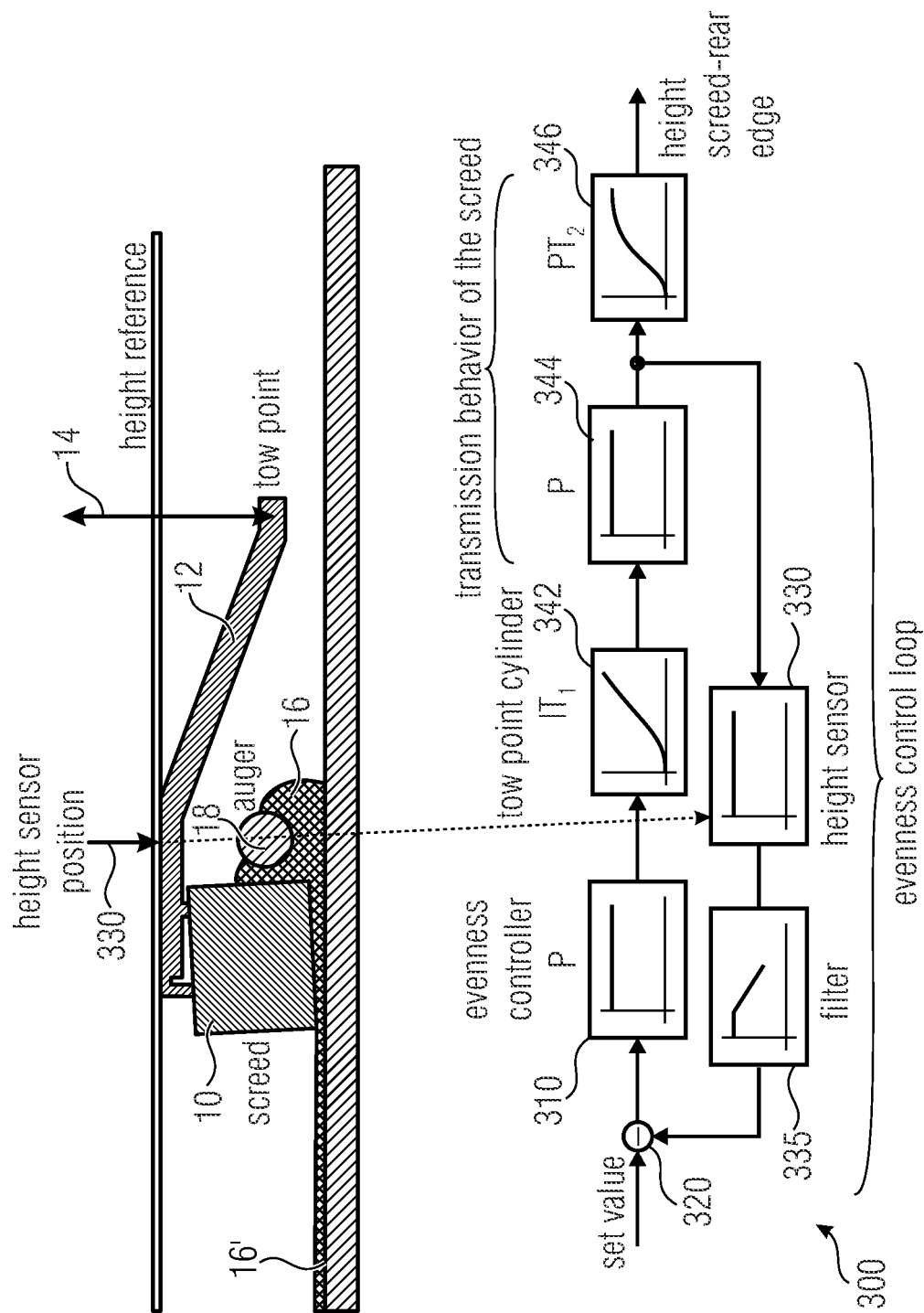
FIG. 3a shows a schematic representation of a common control loop for screed leveling.

FIG. 3a shows a common control loop 300 (evenness control loop) used for leveling the screed 10, which is pulled via the tow arm 12. The tow arm 12 is connected fixedly, or at least during operation connected fixedly, to the screed 10. The screed is towed by a tractor (not shown), for which purpose the tow arm 12 is connected to the tractor via the tow point. The tow point is typically adjustable in height, as illustrated here by the arrow 14. This height adjustment is controlled by the evenness control loop 300.

For the sake of completeness, it should be noted that the screed smooths the asphalt or material for the layer 16' to be applied, which is provided by the auger 18 in front of the screed (cf. material 16).

The evenness control loop 300 comprises an evenness controller 310 which controls the toe point cylinder (cf. reference numeral 14) based on a set-versus-actual point comparison 320. The result is a changed height, which is detected by means of the height sensor 330. The height sensor signal of the height sensor 330 is then in turn fed to the set-versus-actual point comparison 320. Optionally, a filter 335 may also be provided. This filter is implemented either as a low-pass filter, low-pass filter with low/increased cut-off frequency, band-pass filter or high-pass filter, depending on how the transmission behavior is to be corrected. Other frequency filters, such as Chebyshev filters or similar, are also conceivable in this context.

The transmission behavior is influenced by both the tow point cylinder and the screed itself. The transmission behavior of the tow point cylinder can be described using an $IT_1$ control loop (see block 342). The transmission behavior of the screed can be described as follows: in sensor position represented by a P-behavior (cf. 344). The screed itself can be represented by a $PT_2$ element (cf. 346).

At this point, it should be noted that in the case of direct height control with the control loop 300, the transmission behavior 342 and 344 is taken into account, but not 346, since this is very inert. In this respect, the behavior 346 is to be readjusted over time. The transmission behavior 344 is therefore also taken into account, since a change in the height position at the toe point 14 ZP (cf. reference numeral 14) also leads to a change in the height position at the scan point in the region of the auger 18.

Previous levelling systems for the road finishing machine attempt to compensate for all the disturbance variables via a single control loop. The problem here, however, is that there are two dominant and significantly different time constants in the "screed-tow arm" control loop, which needs to be reacted to separately and differently in order to optimally compensate for the influencing disturbance variables. While the screed itself has a very inert behavior and thus a comparatively high time constant in the range of several seconds, the tow point, which is usually controlled by a hydraulic cylinder, has a very small time constant in the range of milliseconds.

Figure 3B:
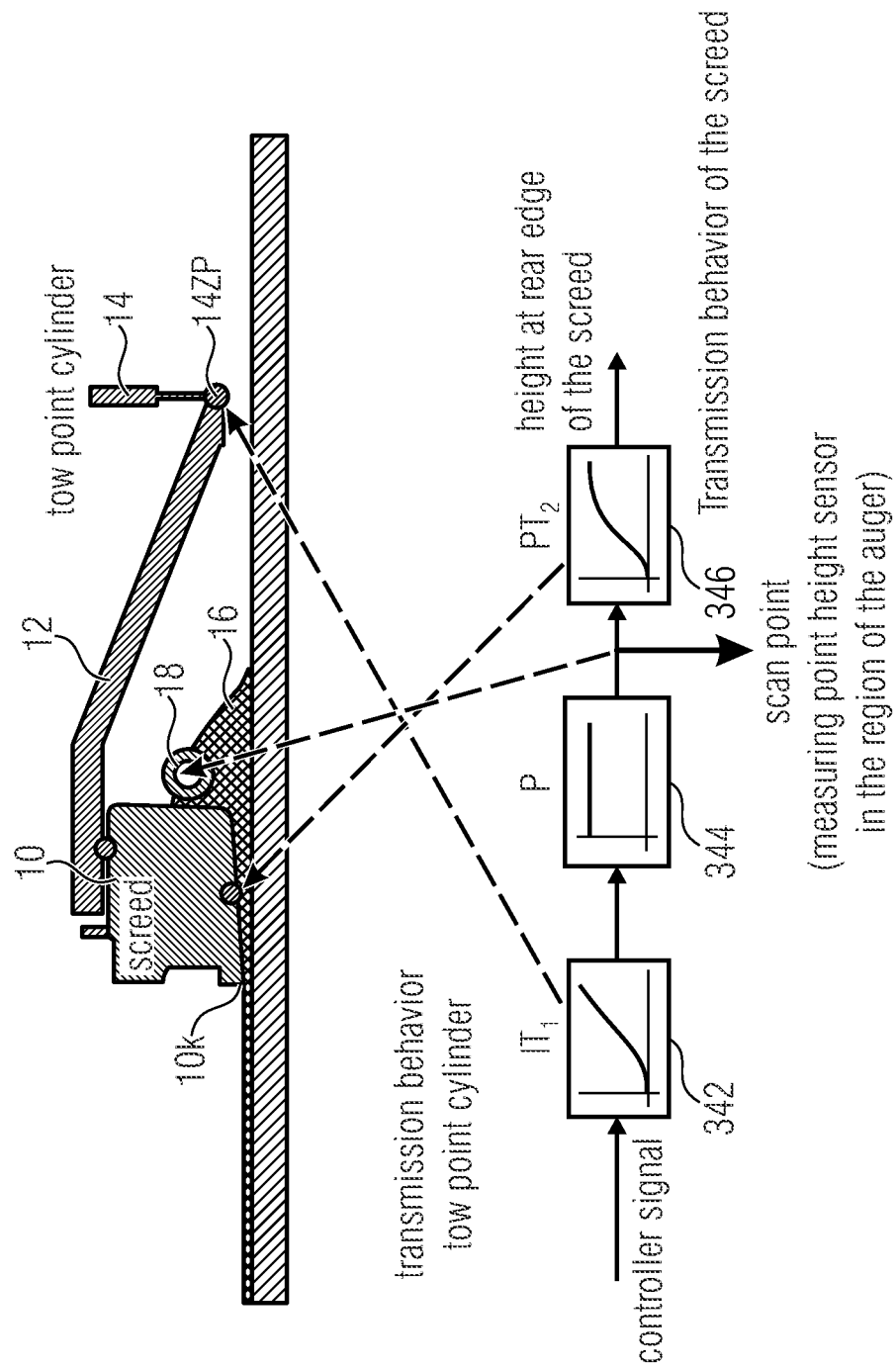
FIG. 3b shows a schematic representation of the controlled system for the screed-tow arm system.

As already indicated above, the transmission behavior of the screed-tow arm system can be described as a kind of series connection of transmission elements:

Tow point cylinder with an IT1 behavior
Height sensor position represented by a P behavior
The screed itself described by a PT2 member FIG. 3b illustrates the transmission behavior of the controlled system from the rear edge of the screed to the cylinder interpreted in this way. FIG. 3b again shows the screed 10, which is pulled or adjusted in height via the tow arm 12 at the tow point 14 ZP by means of the tow point cylinder 14.

FIG. 3b is further intended to illustrate that the usual scan point with respect to the reference does not reflect the behavior of the entire controlled system 342-346, from a control point of view. This also makes it clear that with the current control systems, there is no direct height control of the rear edge of the screed 10k. The result is that, due to disturbance variables acting over a certain period of time, a slight tilting takes place above the scanning point between the rear edge 10k and the tow point 14 ZP and thus a change in height occurs at the rear edge of the screed 10k.

Based on this common control loop structure used in practice for the height leveling of the screed 10, the improved and optimized extension of the screed leveling is explained below.

The basic idea for optimizing the height levelling of the screed 10 is the targeted monitoring of the road finishing machine screed and, in particular, of the screed rear edge by means of an additional control loop or the implementation of a control loop superimposition to the existing height levelling. The control loop for normal height levelling functions as a subordinate control loop. This new control loop structure can be applied to all height levelling tasks and will be considered in detail below.

Figure 3C:
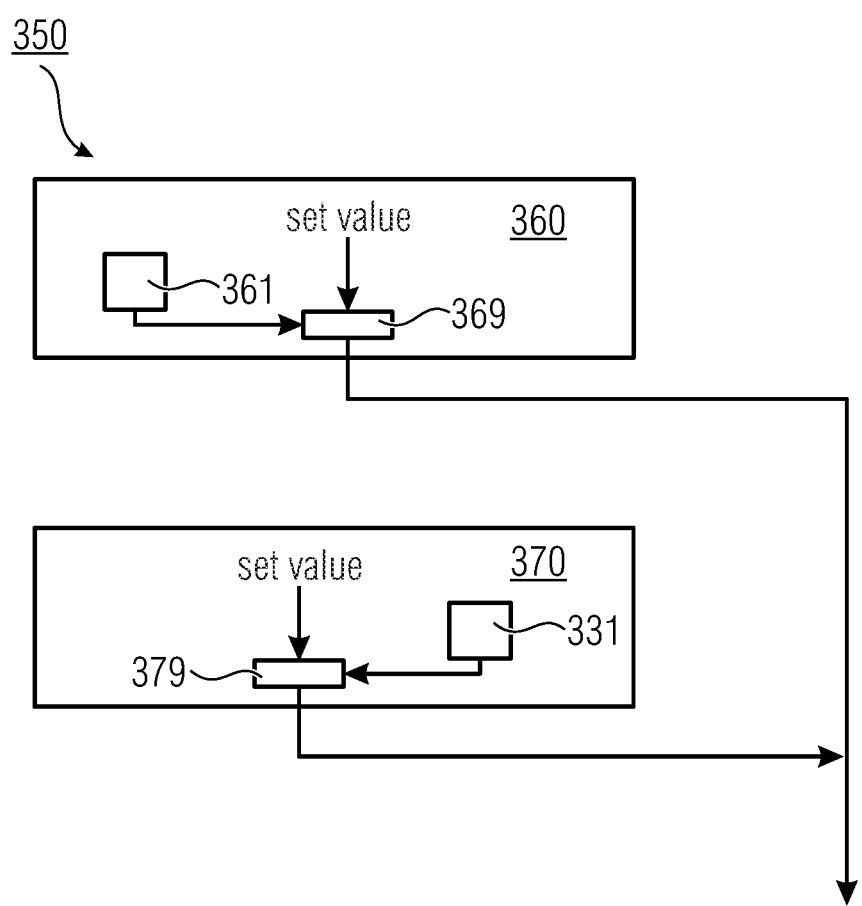
FIG. 3c shows a schematic representation of a control loop structure for screed leveling according to a basic embodiment.

This control loop structure is shown in FIG. 3c. The control loop 350 shown here comprises two individual control loops 360 and 370. The control loop 360 is referred to as the first control loop or superimposed control loop. The control loop 370 as the second control loop. The control loop 370 is similar to the control loop 300 as explained with reference to FIG. 3a, although the sensor 330 is positioned differently (cf. reference character 331). The sensor 331 is provided in the region of the tow point 14 ZP and no longer in the region of the auger 18 (cf. arrangement FIG. 3b). Otherwise, the control loop 370 corresponds to the control loop 300, i.e. includes the comparison 320, the evenness controller 310 as well as the optional filter 335. A significant difference, starting from the positioning of the height sensor, is that in the control loop 370 the transmission behavior of the screed 344 no longer has to be taken into account, but only the transmission behavior of the tow point cylinder (cf. reference numeral 342). The behavior of the screed, described by $PT_2$ (cf. reference numeral 346), is also taken into account with the control loop 360.

The control loop 360 also includes a height sensor 362 and an optional filter 364. The sensor 362 is located in the region of the screed 10 or, for example, in the region of the rear edge of the screed 10. The response of the point 10k to a change in height at the tow point 14 ZP (cf. reference numeral 14) is relatively inert. This becomes quite clear when looking at the arrangement of the screed 10, tow arm 12 and tow point 14 ZP, since the height cylinder 14 shifts the tow point 14 ZP around the pivot point 10k, so that a change in height only occurs gradually. This behavior is reproduced by means of the Model Predictive Control 365. The input variable for the MPC 365 is the result of a set-versus-actual value comparison (cf. reference numeral 367), wherein the same signal of the sensor 362 is used as the actual signal. The result of the MPC is a target signal which serves as an input variable for the comparison 320. Now that the structure has been explained, the mode of functioning will be discussed.

Figure 3D:
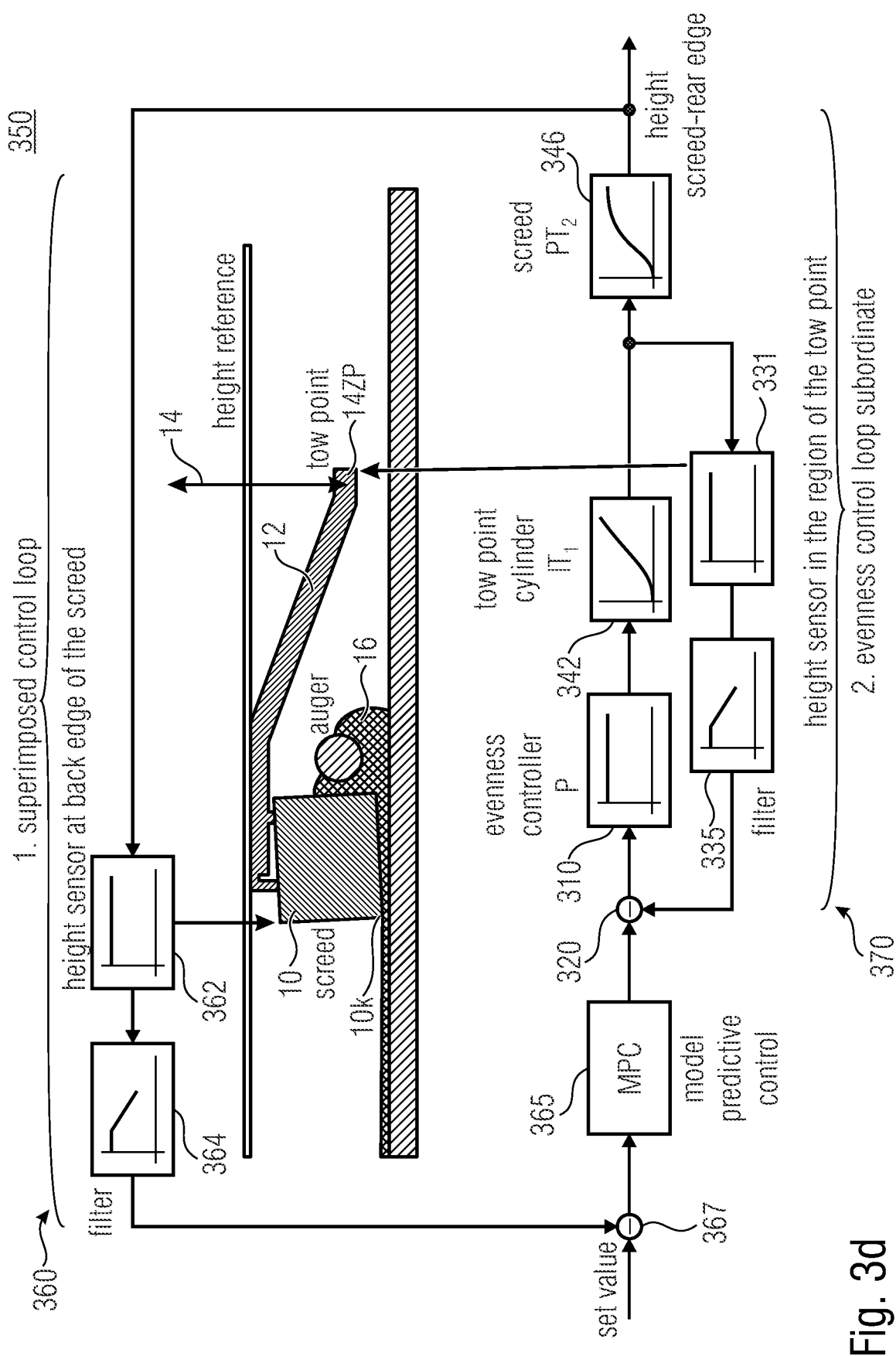
FIG. 3d shows a schematic representation of a control loop structure for screed leveling according to extended embodiments.

Based on these facts, the control loop 370, which is shown in FIG. 3a, is extended by a superimposed control loop 360, which is shown in FIG. 3d. This measure changes the structure of the control loop 350 in such a way that the disturbance variables acting on the tow point 14 ZP and the screed 10 can be compensated separately. The superimposed control loop compensates for the disturbance variables acting on the screed 10 and the subordinate control loop 360 compensates for the disturbance variables changing the height of the tow point. The control system 350 structured in this way can be optimized separately, resulting in an improved overall control behavior.

A further optimization of the control loop structure results from the fact that the scan point tends to be shifted from the height sensor for the subordinate evenness control loop 370 towards the tow point 14 ZP.

Based on this complex embodiment, a simplified variation will now be discussed with reference to FIG. 3d.

FIG. 3d shows a control loop 350 composed of two control loops 370 and 360. Each control loop comprises at least one sensor, which in the case of the control loop 360 is the height sensor 362, while in the case of the control loop 370 it is the tow point sensor 331.

As the name implies and as explained above, the sensors are arranged in the region of the tow point (cf. sensor 331) and at the screed (cf. sensor 361).

Each control loop also includes a corresponding processor, which outputs the control signal for the tow point cylinder based on the actual value of sensors 331 and 362 and a setpoint. The processors are denoted by 379 and 369. According to embodiments, the processors 369 and 379 can also be combined to form one processor, which then receives the actual signals from the two sensors 331 and 362 and first processes these separately in order to then output the common control signal.

The separate consideration of acting disturbance variables for the controlled system 346 screed-tow arm is also of decisive importance for the setup of the control loops 350. FIG. 3e shows the different disturbance variables in the screed-tow arm system.

While the disturbance variables at the tow point are compensated by the subordinate control loop 370 (evenness control loop), the disturbance variables of the screed 10 are compensated by the superimposed control loop 360. Due to the different transfer functions (see also FIG. 3b) of the partial control loop tow point (IT1) and the partial control loop screed (PT2), the controllers used for this purpose are also designed and optimized differently by their structure.

For the subordinate control loop 370, control deviations are compensated extremely quickly, while the controller for the superimposed control loop 360 performs the compensation of control deviations rather slowly, taking into account the knowledge of influencing disturbance variables. As an example of disturbance variables which influence the floating behavior of the screed 10, the effect of material temperature changes can be mentioned here. If a temperature change of the material is already known before a temperature-dependent effect on the screed height arises, the controller can avoid or reduce a height deviation of the screed on the basis of a model. The model of the screed 10 which describes the dependence of a height change due to material temperature changes is to be known. This would also be a typical example of an MPC controller for the superimposed control loop 360.

Different cases of application of the control loop structure 350 are explained below.

Based on the control loop structure 350 in FIG. 3d, the various cases of application will be examined below by way of example. However, the basic structure of the control loop remains the same for all applications. Only the sensor implementation for the rear edge of the screed or the tow point may change. The different installation situations can be named as follows:

Track to track
Scanning at the curb
Rope scanning
Scanning at a line (tunneling)
Installation without reference (Big Sonic-Ski)
3D installation with total station
3D installation with GNSS
Cross tilt screed
Scanning with laser Of course, a different scanning constellation can also be selected for the respective opposite side so that a plurality of installation situations can be represented with the optimized control loop 350. In addition, further optimizations can be realized with the help of the new control loop structure 350. These include:

Start-up after road finishing machine stop
Daily beginning (new beginning)

Integration Model Predictive Control

In the following, some cases of application for the new control loop structure 350 will be described as examples.

If height scanning is done from an existing or previously laid asphalt track (paving track to track), the following sensors can be used for the screed rear edge:
Sonic ski
Single-head sonic with and without reference signal
Laser scanner
Mechanical rotary encoders The single-head sonic without reference can be used because the measuring distance to the existing asphalt track at the rear edge of the screed can be minimized. For this reason, the measurement error is greatly reduced compared to large distances. A minimization of the measuring distance is possible because the measuring distance to the ground is approximately the same. In this application, the/all sensors look at the ground as focused as possible.

The following sensors are used for the tow point:
Sonic-Ski
Laser scanner
Big Sonic-Ski (short: Big Ski)

Figure 3F:
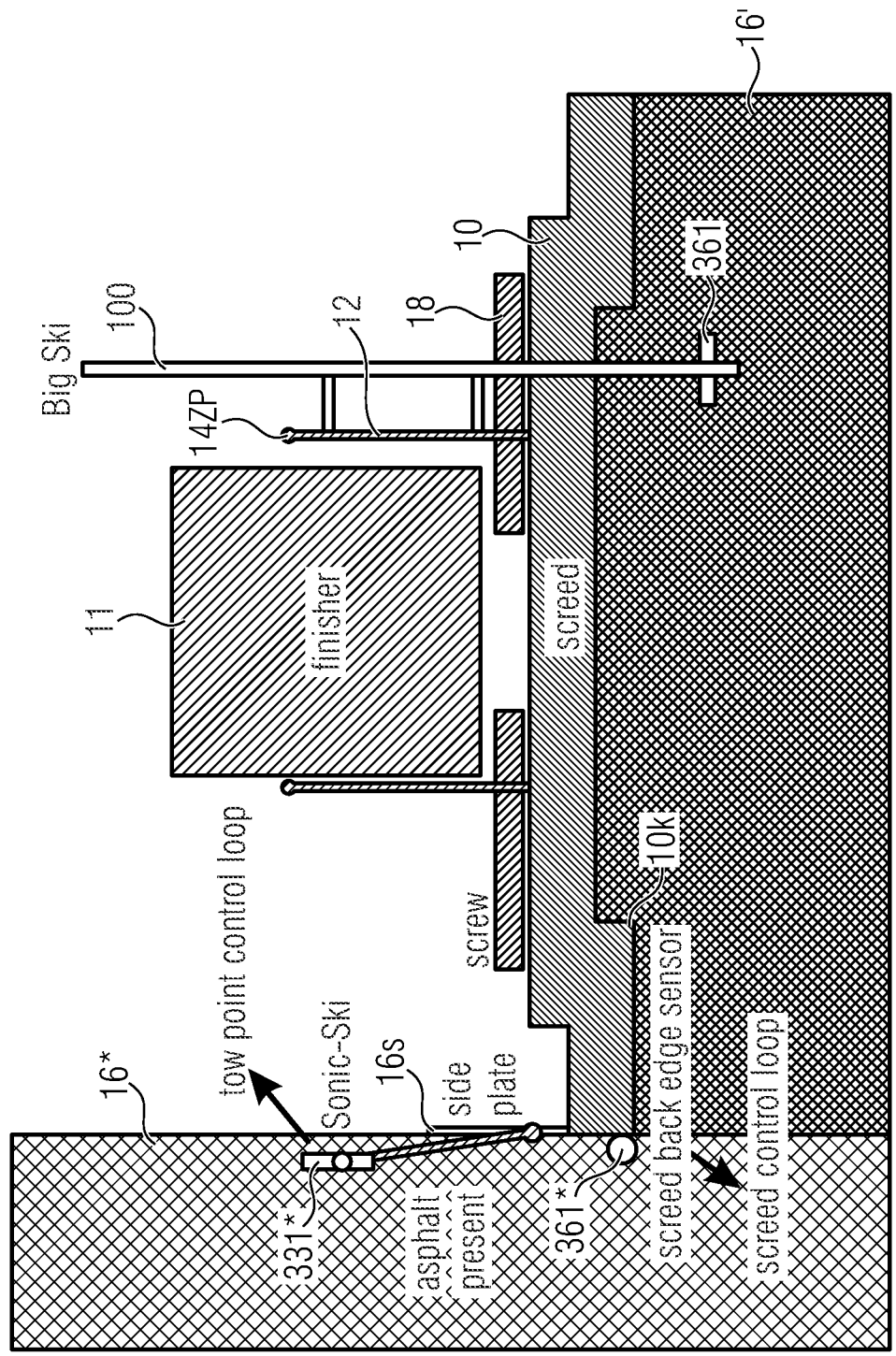
FIG. 3f shows a schematic representation of a track-to-track installation situation.

FIG. 3f shows the mounting region and thus also the possible and useful scanning positions to realize the control loop structure.

FIG. 3f shows the road finishing machine from above with the screed 10, the applied layer 16' or existing layer 16*, the auger 18 and the tractor 11. The screed is connected to the tow point 14 ZP via the tow arm 12.

According to a first variation, a so-called Big Sonic-Ski (in short: Big Ski, cf. aspect 1) 100 can be connected to the tow arm 14 or also to the screed 10 (not shown). The Big Sonic-Ski has, for example, the sensor 361 provided in the region of the rear edge of the screed 10k. At the level of the tow point, the sensor 331 may also be arranged on the Big Sonic-Ski 100.

According to a further embodiment, the scanning of the screed's rear edge for the screed control loop and the scanning for the tow point control loop can also be performed on the side of an existing asphalt track 16*.

Here, a Sonic-Ski 331* is provided via a side plate 10s for scanning at the height of the tow point 14 ZP. A screed rear edge sensor 361* is also provided on the side plate. As shown, the Sonic-Ski 331* is offset slightly with its scanning region outside the ground so as to scan the existing asphalt track 16*.

The purpose of arranging the sensor 331* on the side of the existing asphalt track 16* is to use the existing asphalt track as a reference. In this respect, the sensor 331* is used to scan the distance to the existing asphalt track 16*. The purpose of using the tow point control loop to scan the existing asphalt track 16* is to directly compensate for disturbance variables (e.g. material under the crawler track of the tractor) which act on the tow point. In contrast, the sensor 361* is directed at the existing asphalt layer 16* and monitors the elevation of the screed in relation to the existing asphalt track 16*, compensating for deviations from the set target value of the superimposed control loop 360.

Figure 3G:
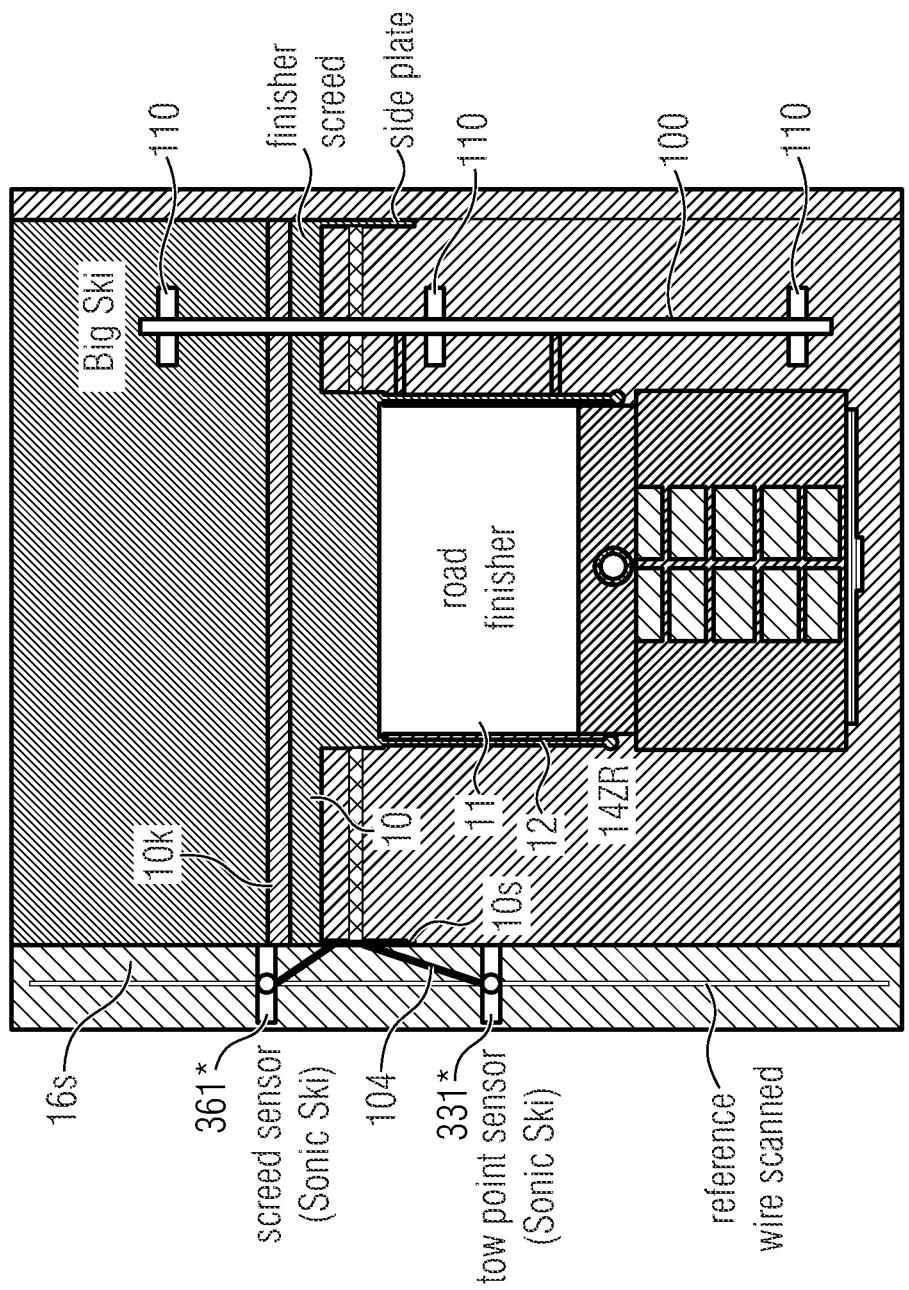
FIG. 3g shows a schematic representation of rope scanning with two sensors.

With reference to FIG. 3g, a rope scanning system is now explained. FIG. 3g shows a road finishing machine with a tractor 11, a screed 10, a screed rear edge 10k. The screed 10 is connected to the road finishing machine 11 by a tow arm 12. The Big Sonic-Ski 100 with three sensors is provided on one of the tow arms 12. The sensors are denoted by the reference numeral 110 as an example, and, depending on the application, can be equally distributed along the Big Sonic-Ski 100 or also arranged in the region of the tow point 14 ZP or also in the region of the rear edge of the screed 10k. Alternatively or additively to a Big Sonic-Ski, a sensor system may also be provided over the side plate 10s of the screed 10. For example, a screed sensor 361* may be provided, as well as a tow point sensor 331*. Both are directed to a rope 16s to scan the rope 16s.

Rope scanning at the rear edge of the screed 10k can be performed without contact using an ultrasonic sensor (Sonic-Ski) or a mechanical encoder, as is common practice with the scanning methods currently in use.

The sensors 331*, 361* are guided over the reference rope 16s with a corresponding sensor holder 10k. The system deviation measured relative to the reference rope 16s at the rear edge of the screed 10k also provides information on the installed evenness when viewed over the path.

For the region from the tow point 14 ZP, there are several ways to obtain height information for the control loop. In the following, 2 possibilities are shown.

A second height sensor (Sonic-Ski) can be guided over the rope via a further sensor holder. Alternatively, a Big Sonic-Ski system (Big Ski in short) can be used as a tow arm sensor. See FIG. 3h.

Figure 3H:
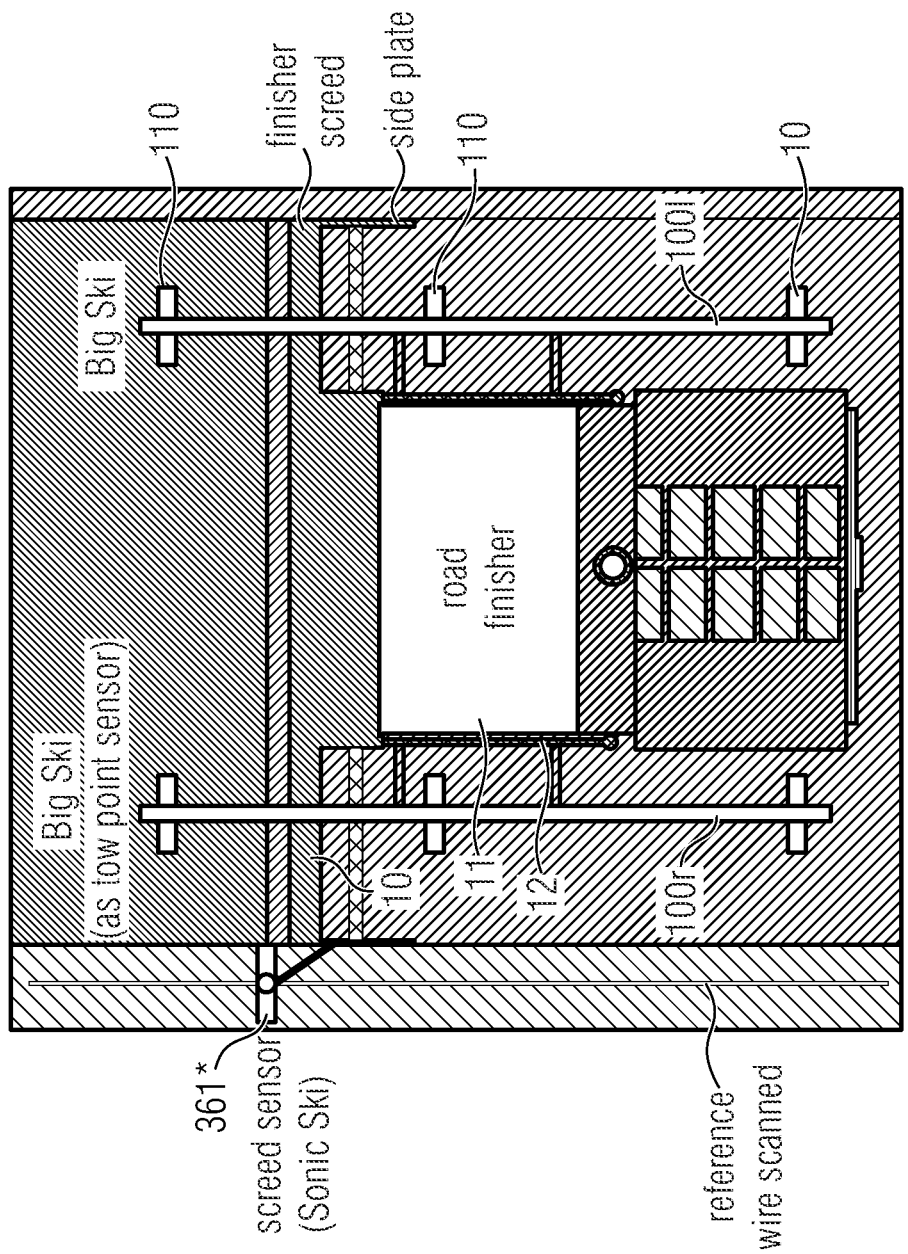
FIG. 3h shows rope scanning with screed sensor and Big Sonic-Ski for tow point control.

FIG. 3h shows the comparable setup as FIG. 3g of the road finishing machine 11 with a screed 10. The sensor 361* is used as the screed sensor on the left side. The Big Sonic-Ski 100R is used as the tow point sensor on the left side. As already explained, it is permanently connected to the tow arm 12 and has a plurality of sensors 110.

With regard to the Big Sonic-Ski 100, it should be noted that, as already explained in connection with aspect 1, one or more sensors, e.g. equally distributed, are arranged in front of and behind the screed 10. With respect to further details in this regard, reference is made to the explanation of aspect 1.

Figure 3I:
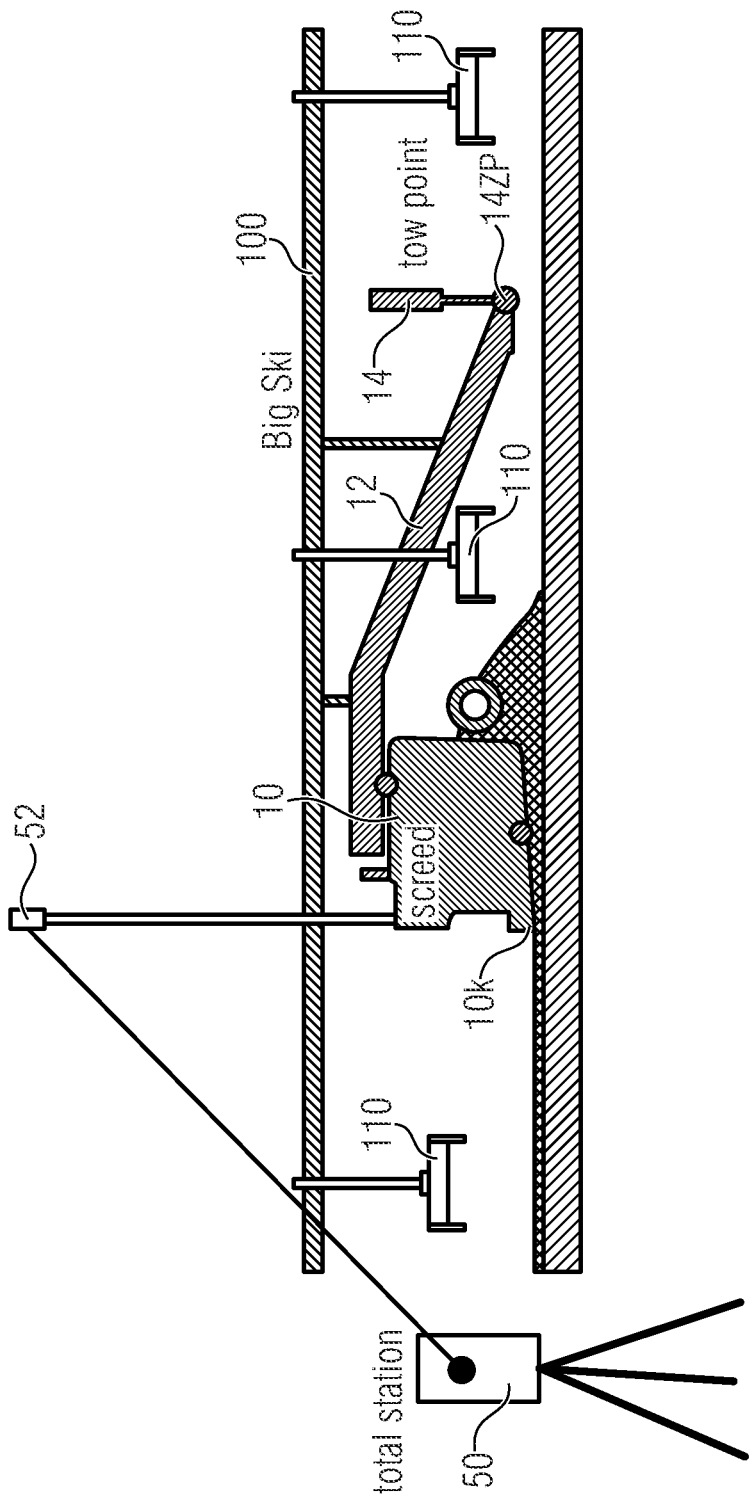
FIG. 3i shows a schematic representation of a setup of a 3D system with total station and Big Sonic-Ski.

Referring to FIG. 3i, 3D leveling with a total station is now explained. FIG. 3i shows the screed 10 with the screed rear edge 10k, the tow arm 12, which is connected to the tow cylinder 14 at the tow point 14 ZP. In addition, a Big Sonic-Ski 100 connected to the tow arm 12 is also provided. The Big Sonic-Ski 100 includes three distance sensors 110, which together determine the distance at the tow point 14 ZP in this embodiment. The screed rear edge 10k is monitored using a total station 50 and a reflector 52 attached to the screed. This sensor consisting of elements 50+52 is referred to as a 3D sensor.

Height determination at the rear edge of the screed with a 3D sensor 50+52 has the advantage that it is also possible to monitor the absolute height position of the asphalt track to be paved. 3D levelling with a total station 50 consists of a prism 52 mounted on the road finishing machine 11 or screed 10 in such a way that it is visible to the total station 50. The total station 50 then determines the 3D position of the prism in space and transmits this information to the 3D control system on the road finishing machine by radio.

A major disadvantage of 3D control is that the installed height level is to be checked again and again. In practice, this task is performed by a surveyor who checks the installed height level with an additional total station 50 and, if needed, makes appropriate corrections manually. This is needed because the mounting location of the prism (3D point in space precisely determined by the total station via the reflection of a laser beam) is not located at the rear edge of the screed, but, as is usually the case with other height sensors, at the tow arm at the height of the screed auger. This results in a change of the elevation at the rear edge of the screed over a certain period of time, which the surveyor then has to correct again.

If considering the improved control loop structure 350, there are also optimization possibilities for 3D control with a total station.

The control of the built-in height measurement could be avoided by placing the height sensor (prism) on the screed rear edge 10k. Here, the sensor acts as a height sensor for the screed and is thus used in the superimposed control loop 360 as a supplier of the height information. For example, a Big Sonic-Ski system (Big Ski in short) is then located at the tow point, which supplies the height value for the subordinate control loop 370.

A further advantage arises if wanting to level both sides of the screed 10 via a total station 50 in connection with a prism 52 (cf. FIG. 3i). Without the extended and optimized control loop structure 350, two total stations 50 are needed for leveling (one total station for each side). This is needed because in this constellation the scan rate of the 3D height measurement has to be high in order to compensate for all influencing disturbance variables. With the expanded and optimized control loop structure 350, the scan rate can be reduced to such an extent that one total station is sufficient for both sides, which then continuously and successively determines the left prism 52l and the right prism 52r in the position at the screed rear edge 10k.

Figure 3J:
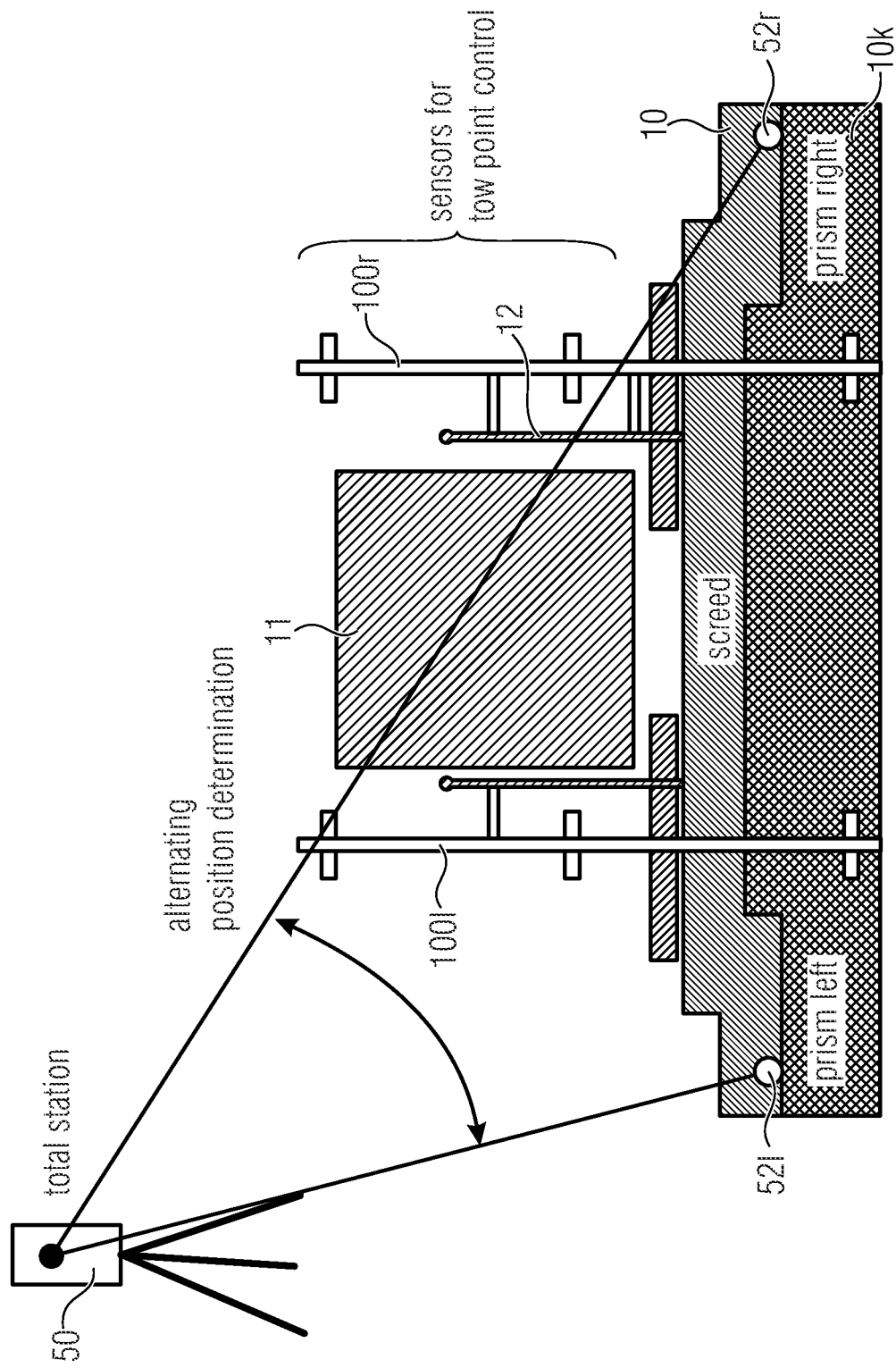
FIG. 3j shows a schematic representation of a leveling system with a total station and two prisms.
Figure 3K:
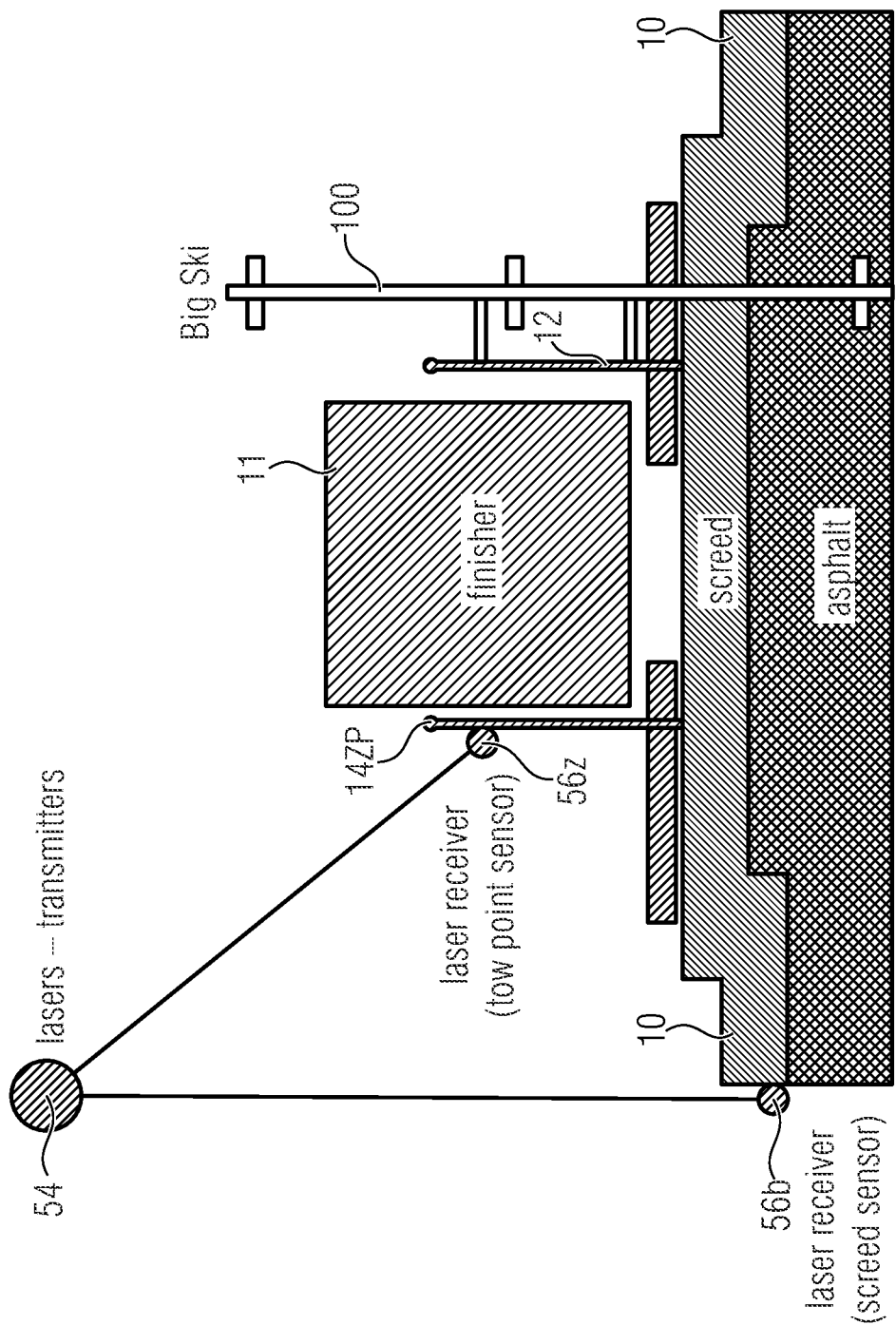
FIG. 3k shows a schematic representation of leveling with laser.
Figure 4:
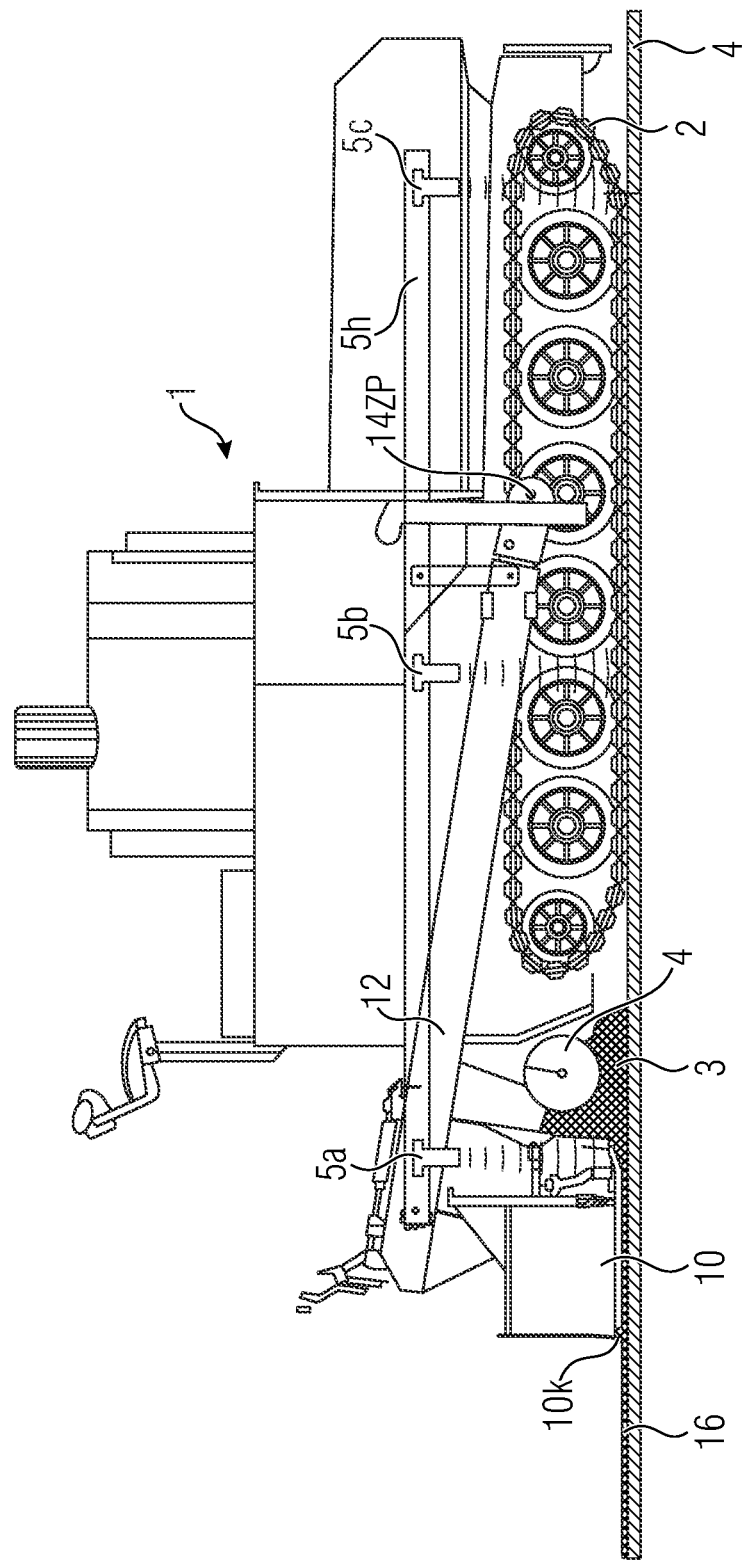
FIG. 4 shows a known road finishing machine.

Referring to FIG. 3k, instead of the left Big Sonic-Ski 100 L which served as the tow point control in FIG. 3j, the tow point sensor is now also implemented by a laser sensor. A laser transmitter 54 maps a height reference which can be received at the screed 10 via the receivers 56z at the tow point 14 ZP and 56b.

In principle, the new control loop structure 350 can also be applied when using a laser plane as a height reference. In this case, a laser receiver is attached to both the tow arm and the rear edge of the screed, which in both cases operates as a height sensor. In this constellation, the projected laser plane exactly represents the desired position of the road with a corresponding height offset.

FIG. 3k shows the basic setup of leveling with a laser height reference on the left side. In the example, the right side is leveled with a Big Sonic-Ski system 100. Alternatively, depending on the installation situation, other measuring elements such as inclination sensors or Sonic Ski, can be used for leveling the screed.

Referring to FIG. 3d, note that the Model Predictive Control extends the control loop structure as follows.

A further improvement for the control system results from the fact that the controller for the superimposed control loop, whose associated sensor is installed near the rear edge of the screed, also takes the respective process state into account. In principle, a control value is assigned to each state, which is also responsible for the calculation of the controller output. Furthermore, the process state is predetermined with the help of a process model.

The process model is the actual foundation of Model Predictive Control, wherein the model comprehensively captures the process dynamics and can thus calculate the predictions of the future process state. The process model is needed to calculate the predicted output variables in a future instance. The various strategies of MPC can use numerous models to show the relationship between the output variables and the measurable input variables.

In the following, additional embodiments and aspects of the invention will be described which can be used individually or in combination with any of the features and functionalities and details described herein.

A first aspect relates to a measuring system 200 for a construction machine, wherein the measuring system 200 comprises a carrier connectable to a component of the construction machine, wherein the measuring system 200 comprises: first, second and third sensor heads that are connected to the carrier 210 and are configured to measure a first distance from the first sensor head to a ground or reference to obtain a first measuring value, and to measure a second distance from the second sensor head to a ground or reference to obtain a second measuring value, and to measure a third distance from the third sensor head to a ground or reference to obtain a third measuring value; a calculation unit that is configured to determine, based on the first measuring value, the second measuring value and the third measuring value, a regression line RG together with a slope of the regression line relative to the ground or the reference and to determine, based on the slope, an angle that describes the slope of the regression line RG and the position of the component of the construction machine relative to the ground or the reference; wherein the first, second and third sensor heads have a substantially parallel orientation, such that a scanning area extending in parallel or substantially in parallel is formed.

A second aspect relates to a measuring system 200 according to aspect 1, wherein the component includes a tow arm 12 or a screed 10 and/or a screed 10 connected fixedly via the tow arm 12, rigidly and/or at least rigidly during the working process having a fixedly defined relationship between component and measuring system 200 or a relationship at least fixedly defined during the working process.

A third aspect relates to a measuring system 200 according to aspect 1 or 2, wherein the carrier 210 extends in front of the screed 10.

A fourth aspect relates to a measuring system 200 according to aspect 1, 2 or 3, wherein the measuring system comprises a further first, further second and further third sensor head that are connected to a further carrier 215 and configured to measure a further first distance from the further first sensor head to the ground or to the reference to obtain a further first measuring value, and to measure a further second distance from the further second sensor head to the ground or to the reference to obtain a further second measuring value, and to measure a further third distance from the further third sensor head to the ground or to the reference to obtain a further third measuring value; wherein the calculation unit is configured to determine, based on the further first, further second and further third measuring value, a further regression line RG2 together with a slope of the further regression line RG2 relative to the ground or the reference and to determine, based on the slope, an angle $\alpha$ describing the slope of the further regression line RG2 and the position of the component of the construction machine relative to the ground.

A fifth aspect relates to a measuring system 200 according to aspect 3, wherein the further carrier 215 extends behind the screed 10.

A sixth aspect relates to a measuring system 200 according to aspect 3 or 4, wherein the carrier 210 extends in front of the screed 10 and/or wherein the calculation unit is configured to determine a layer thickness based on the regression line RG and the further regression line RG2.

A seventh aspect relates to a measuring system 200 according to one of aspects 1 to 6, wherein the carrier 210 extends along a longitudinal axis of the construction machine.

An eighth aspect relates to a measuring system 200 according to aspect 7, wherein the measuring system is configured to determine an angle $\alpha$ relative to the ground in the longitudinal direction of the measuring system, a rotation of a screed 10 around a longitudinal axis of the screed 10 and/or a longitudinal inclination of the chassis.

A ninth aspect relates to a measuring system 200 according to one of aspects 1 to 8, wherein the carrier 210 or a further carrier 215 extends in an oblique or translational manner to a longitudinal axis of the screed 10.

A tenth aspect relates to a measuring system 200 according to aspect 9, wherein the measuring system 200 is configured to determine an angle α relative to the ground in transversal direction, a tilting of the screed 10 and/or a transversal inclination of the chassis.

An eleventh aspect relates to a measuring system 200 according to one of aspects 1 to 10, wherein the measuring system 200 includes one or several additional sensor heads, such that the same includes at least four sensor heads.

A twelfth aspect relates to a measuring system 200 according to aspect 11, wherein the calculation unit is configured to determine a regression line RG based on a point cloud defined by the first, the second, the third and a fourth measuring value.

A thirteenth aspect relates to a measuring system 200 according to one of aspects 1 to 12, wherein the measuring system 200 comprises an inclination sensor determining an absolute inclination and/or wherein the calculation unit is configured to determine, based on the absolute inclination, an absolute inclination of the component of the construction machine together with the angle α.

A fourteenth aspect relates to a measuring system 200 according to one of aspects 1 to 13, wherein averaging and/or temporal averaging of the measuring value takes place.

A fifteenth aspect relates to a measuring system 200 according to one of aspects 1 to 14, wherein the first sensor head 221 and the second sensor head 222 are spaced apart along the carrier 210.

A sixteenth aspect relates to a measuring system 200 according to one of aspects 1 to 15, wherein the calculation unit is configured to consider based on a distance of the first sensor head and the second sensor head and/or the third sensor head during the calculation.

A seventeenth aspect relates to a layer thickness measuring system for a construction machine, wherein the layer thickness measuring system comprises a carrier 210 and a further carrier 215 connectable to a screed 10 of the construction machine such that the carrier 210 extends in front of the screed 10 and the further carrier 215 extends behind the screed 10, the layer thickness measuring system comprising: first, second and third sensor heads that are connected to the carrier 210 and are configured to measure a first distance from the first sensor head to a ground or a reference to obtain a first measuring value, and to measure a second distance from the second sensor head to a ground or a reference to obtain a second measuring value, and to measure a third distance from the third sensor head to a ground or a reference to obtain a third measuring value; a further first, further second and further third sensor head that are connected to a further carrier 210 and are configured to measure a further first distance from the further first sensor head to a deposited layer to obtain a further first measuring value, and to measure a further second distance from the further second sensor head to the deposited layer to obtain a further second measuring value, and to measure a further third distance from the further third sensor head to the deposited layer to obtain a further third measuring value; a calculation unit configured to determine a regression line RG based on the first, second and third measuring values H1, H2, H3, and to determine a further regression line RG2 based on the further first, further second and further third measuring value; wherein the calculation unit is configured to determine a layer thickness based on the position of the regression line RG relative to the further regression line RG2.

An eighteenth aspect relates to a layer thickness measuring system according to aspect 17, wherein the carrier 210 and the further carrier 215 run parallel or are oriented in the same direction or in a fixed relationship to one another; and/or wherein the regression line RG and the further regression line RG run in parallel or are aligned such that the regression line RG and the further regression line RG2 run in parallel.

A nineteenth aspect relates to a layer thickness system according to aspect 17 or 18, wherein an offset of the regression line RG relative to the further regression line RG2 corresponds to a layer thickness or allows conclusions on the layer thickness.

A twentieth aspect relates to a Construction machine, in particular a road construction machine, such as a road finishing machine or a road milling machine comprising a measuring system 200 or layer thickness measuring system according to one of aspects 17 to 19.

A twenty-first aspect relates to a method for determining a position of a component of a construction machine by using a measuring system 200, wherein the measuring system 200 comprises a carrier 210 connectable to a component of the construction machine, comprises a first, a second and a third sensor head that are connected to the carrier 210 and configured to measure a first distance from the first sensor head to the ground to obtain a first measuring value H1, and to measure a second distance from the second sensor head to the ground to obtain a second measuring value H2, and to measure a third distance from the third sensor head to a ground or a reference to obtain a third measuring value H3, wherein the first, second and third sensor heads have a substantially parallel orientation, such that a scanning area extending in parallel or substantially in parallel is formed, comprising: determining a regression line RG together with a slope of the regression line RG relative to the ground or the reference based on the first, second and third measuring values H1, H2, H3; and determining an angle α describing the slope of the regression line RG and the position of the component of the construction machine relative to the ground, based on the slope.

A twenty-second aspect relates to a method according to aspect 21, wherein the measuring system comprises a further first, further second and further third sensor head that are connected to a further carrier 215 and are configured to measure a further first distance from the further first sensor head to the ground or to the reference to obtain a further first measuring value, and to measure a further second distance from the further second sensor head to the ground or the reference to obtain a further second measuring value, and to measure a further third distance from the further third sensor head to the ground or the reference to obtain a further third measuring value; the method comprising: determining a further regression line RG2 together with a slope of the further regression line RG2 relative to the ground or the reference based on the further first, further second and further third measuring values; and determining an angle α describing the slope of the further regression line RG2 and the position of the component of the construction machine relative to the ground, based on the slope, determining a layer thickness based on the regression line RG and the further regression line RG2.

A twenty-third aspect relates to a method for determining a layer thickness by means of a layer thickness measuring system comprising a carrier 210 and further carrier 215 connectable to a screed 10 of the construction machine such that the carrier 210 extends in front of the screed 10 and the further carrier 215 extends behind the screed 10, wherein the layer thickness measuring system further comprises first, second and third sensor heads that are connected to the carrier 210 and are configured to measure a first distance from the first sensor head to a ground or a reference to obtain a first measuring value, and to measure a second distance from the second sensor head to a ground or a reference to obtain a second measuring value; and to measure a third distance from the third sensor head to a ground or a reference to obtain a third measuring value; wherein the layer thickness measuring system comprises a further first, further second and further third sensor head that are connected to a further carrier 215 and are configured to measure a further first distance from the further first sensor head to a deposited layer to obtain a further first measuring value, and to measure a further second distance from the further second sensor head to the deposited layer to obtain a further second measuring value; and to measure a further third distance from the further third sensor head to the deposited layer to obtain a further third measuring value; comprising: determining a regression line RG based on the first, second and third measuring values H1, H2, H3; and determining a further regression line RG2 based on the further first, further second and further third measuring value; determining a layer thickness based on the position of the regression line relative to the further regression line RG2.

A twenty-fourth aspect relates to a computer program having a program code for performing any of the above methods when the program runs on a measuring system of an inventive construction machine on an measuring system according to one of aspects 1 to 16 or a layer thickness measuring system according to one of aspects 17 to 19.

Although some aspects have been described in the context of a device, it is understood that these aspects also represent a description of the corresponding method so that a block or component of a device is also to be understood to be a corresponding method step or feature of a method step. Similarly, aspects described in connection with or as a method step also constitute a description of a corresponding block or detail or feature of a corresponding device. Some or all of the method steps may be performed by (or using) a hardware apparatus, such as a microprocessor, a programmable computer, or an electronic circuit. In some embodiments, some or more of the key method steps may be performed by such an apparatus.

Depending on particular implementation requirements, embodiments of the invention may be implemented in hardware or in software. The implementation may be performed using a digital storage medium, for example, a floppy disk, DVD, Blu-ray disc, CD, ROM, PROM, EPROM, EEPROM, or FLASH memory, a hard disk, or any other magnetic or optical storage medium on which electronically readable control signals are stored which can or do interact with a programmable computer system so as to perform the particular method. Therefore, the digital storage medium may be computer-readable.

Thus, some embodiments according to the invention include a data carrier having electronically readable control signals capable of interacting with a programmable computer system such that any of the methods described herein are performed.

Generally, embodiments of the present invention may be implemented as a computer program product having program code, the program code being operative to perform any of the methods when the computer program product runs on a computer.

For example, the program code may also be stored on a machine-readable medium.

Other embodiments include the computer program for performing any of the methods described herein, wherein the computer program is stored on a machine-readable medium.

In other words, an embodiment of the inventive method is thus a computer program having program code for performing any of the methods described herein when the computer program runs on a computer.

Thus, another embodiment of the inventive methods is a data carrier (or digital storage medium or computer-readable medium) on which is recorded the computer program for performing any of the methods described herein. The data carrier, digital storage medium, or computer-readable medium is typically tangible and/or non-transitory or non-transient.

Thus, another embodiment of the inventive method is a data stream or sequence of signals which represents the computer program for performing any of the methods described herein. For example, the data stream or sequence of signals may be configured to be transferred over a data communication link, such as over the Internet.

Another embodiment includes a processing device, such as a computer or programmable logic device, configured or adapted to perform any of the methods described herein.

Another embodiment includes a computer having installed thereon the computer program for performing any of the methods described herein.

Another embodiment according to the invention includes a device or system configured to transmit a computer program for performing at least one of the methods described herein to a receiver. The transmission may be, for example, electronic or optical. The receiver may be, for example, a computer, mobile device, storage device, or similar device. The device or system may include, for example, a file server for transmitting the computer program to the receiver.

In some embodiments, a programmable logic device (for example, a field programmable gate array, FPGA) may be used to perform some or all of the functionalities of the methods described herein. In some embodiments, a field programmable gate array may interact with a microprocessor to perform any of the methods described herein. Generally, in some embodiments, the methods are performed on the part of any hardware device. This may be general-purpose hardware, such as a computer processor (CPU), or hardware specific to the method, such as an ASIC.

The devices described herein may be implemented using, for example, a hardware apparatus, or using a computer, or using a combination of a hardware apparatus and a computer.

The devices described herein, or any components of the devices described herein, may be implemented at least in part in hardware and/or in software (computer program).

For example, the methods described herein may be implemented using a hardware apparatus, or using a computer, or using a combination of a hardware apparatus and a computer.

The methods described herein, or any components of the methods described herein, may be performed at least partly by hardware and/or by software.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A construction machine comprising a measuring system, wherein the measuring system comprises a carrier connectable to the construction machine, such that the carrier extends along a longitudinal axis of the construction machine, especially laterally to the same, comprising:
at least a first portion of the carrier; wherein the first portion comprises a plurality of sensor heads attached to or integrated with the first portion for non-contact measurement against a ground or reference as well as first and second end faces, and wherein the first portion comprises a second connecting element at a second end face, the second connecting element being connectable to a first connecting element such that both a mechanical and electrical connection is formed.

2. The construction machine according to claim 1 comprising a second portion of the carrier, wherein the second portion comprises a plurality of attached or integrated sensor heads, wherein the second portion comprises the first connecting element at a first end face, wherein the second connecting element of the first portion is connectable to the first connecting element of the second portion such that both a mechanical and electrical connection is formed.

3. The construction machine according to claim 1, wherein the measuring system comprises an attachment element connectable to the construction machine or a component of the construction machine and comprising a first and/or a second connecting element; or
wherein the measuring system comprises an attachment element connectable to the construction machine or a component of the construction machine and comprising a first and/or a second connecting element, such that the first portion is connectable to the construction machine or the component of the construction machine.

4. The construction machine according to claim 1, wherein the first and/or the second portion comprises sensor heads aligned on a longitudinal side perpendicular to the longitudinal axis of the first and the second portion; or
wherein the first and/or the second portion comprises sensor heads on a longitudinal side that are directed to the ground or the reference.

5. The construction machine according to claim 1, wherein the first and/or the second portion each comprise a plurality of attached or integrated sensor heads and/or at least three attached or integrated sensor heads.

6. The construction machine according to claim 1, wherein the sensor heads differ with respect to their measurement principles.

7. The construction machine according to claim 1, wherein the measuring system comprises a reflector or an inclined reflector at the first and/or a second end face.

8. The construction machine according to claim 1, wherein the electrical connection comprises a contact connection, inductive or non-contact connection.

9. The construction machine according to claim 1, wherein the measuring system comprises at least one third further sensor head per first and/or second portion or per carrier that is aligned parallel to the longitudinal axis and/or that is arranged on the first and/or second end face; and/or wherein the third further sensor is configured to determine a distance to an object performing a relative movement with respect to the construction machine or a component of the construction machine.

10. The construction machine according to claim 1, wherein measurements of the sensor heads substantially take place simultaneously.

11. The construction machine according to claim 1, wherein the first portion comprises a display or an LED display,
wherein the display and/or LED display is configured to display a connecting state between the first and second portions or to display information, e.g., with respect to a deviation of the measuring system or a control system connected to the measuring system.

12. The construction machine according to claim 1, wherein the measuring system comprises a sensor, a GNSS sensor, an inclination sensor, an infrared sensor, a temperature sensor, a position sensor or a further sensor.

13. The construction machine according to claim 1, wherein the measuring system comprises a third portion comprising a first connecting element at a first end face, wherein the first connecting element is connectable to a second connecting element, such that both a mechanical and electrical connection is formed.

14. The construction machine according to claim 1 comprising a road construction machine, a road finishing machine or a road milling machine.

15. The construction machine according to claim 1, wherein a second portion comprises a second connecting element at a second end face and/or the first portion comprises a first connecting element at a first end face.

16. The construction machine according to claim 15, wherein the first and/or the second connecting elements comprises an electrical coupler extending substantially along the longitudinal direction of the respective portion.

17. The construction machine according to claim 1, wherein the first and/or the second connecting element comprises a hook, such that the first connecting element and the second connecting element can be engaged by a rotational movement.

18. The construction machine according to claim 17, wherein the hook of the first or second connecting element or the hooks of the first and second connecting elements comprise an engagement surface that is opened substantially perpendicular to the longitudinal direction of the respective portion; and/or
wherein the rotational movement is defined by an end stop that needs the first and second end faces to be in contact.

19. The construction machine according to claim 1, wherein the first and/or second connecting elements comprise a profile comprising an end stop extending substantially perpendicular to the longitudinal direction of the respective portion, such that the two connecting elements are connectable by a translational movement substantially perpendicular to the longitudinal direction of the respective portion.

20. The construction machine according to claim 19, wherein the first and/or second connecting element each comprise an electrical coupler extending substantially perpendicular to the longitudinal direction of the respective portion.

21. The construction machine according to claim 1, wherein the first connecting element comprises a sleeve extending substantially in the longitudinal direction of the respective portion and wherein the second connecting elements are connectable by inserting the second connecting element into the sleeve.

22. The construction machine according to claim 21, wherein the first and/or the second connecting element comprise a respective electrical coupler extending substantially along the longitudinal direction of the respective portion.

23. The construction machine according to claim 21, wherein the first connecting element comprises a lever mechanism and/or a lever mechanism with an eccentric, for translationally fixing the first connecting element to the second connecting element.

24. The construction machine according to claim 1, wherein in the respective first the sensors heads are spaced apart from each other.

25. The construction machine according to claim 24, wherein the sensor heads are equally distributed in the respective first and/or second portion or across the carrier.

26. The construction machine according to claim 1, wherein the measuring system comprises at least one first further sensor head per first and/or second portion or per carrier that is aligned parallel to the longitudinal axis and/or arranged at the first and/or second end face; and/or wherein the first further sensor head is configured to perform a reference measurement.

27. The construction machine according to claim 26, wherein the measuring system comprises a second sensor head per first and/or second portion that is arranged along the longitudinal axis of the respective first and/or second portion or the carrier and that is on the opposite end face of the first further sensor head.

* * * * *